(12) United States Patent
Mueller et al.

(10) Patent No.: US 6,904,969 B2
(45) Date of Patent: Jun. 14, 2005

(54) TIME-BAKE CYCLE FOR A REFRIGERATED OVEN

(75) Inventors: Dianne D. Mueller, Englewood, OH (US); Dale Lukens, Vandalia, OH (US); David J. Anderson, Tipp City, OH (US); Ralph Tate, Jr., Evansville, OH (US); Thomas J. Leichliter, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 09/977,757

(22) Filed: Oct. 15, 2001

(65) Prior Publication Data

US 2003/0070799 A1 Apr. 17, 2003

(51) Int. Cl.[7] ............................................. F25B 29/00
(52) U.S. Cl. ..................... 165/254; 165/48.1; 165/61; 165/918; 426/523; 99/335
(58) Field of Search ........................... 99/324, 325, 331, 99/357, 467, 468, 340; 426/520, 523, 231, 233; 219/490, 506, 385, 492, 391, 483, 486; 165/48.1, 63, 64, 61, 918, 919, 254

(56) References Cited

U.S. PATENT DOCUMENTS

| | | | |
|---|---|---|---|
| 2,091,292 A | 8/1937 | Scurlock | 62/116 |
| 2,462,115 A | 2/1949 | Luecke | 62/116 |
| 2,504,794 A | 4/1950 | Berman et al. | 257/3 |
| 2,619,269 A | 11/1952 | Reynolds | 62/89 |
| 2,823,902 A | 2/1958 | Reynolds | 257/4 |
| 3,206,943 A | 9/1965 | Rice et al. | 62/302 |
| 3,353,476 A | 11/1967 | Goodman et al. | 99/328 |
| 3,516,485 A | 6/1970 | Rhoads et al. | 165/27 |
| 3,603,241 A * | 9/1971 | Drucker | 99/335 |
| 3,604,334 A * | 9/1971 | Ballentine | 99/483 |
| 3,608,627 A | 9/1971 | Shevlin | 165/12 |
| 3,712,078 A | 1/1973 | Maynard et al. | 62/448 |
| 3,797,563 A | 3/1974 | Hoffmann et al. | 165/48 |
| 3,965,969 A | 6/1976 | Williamson | 165/12 |
| 4,019,339 A | 4/1977 | Anderson | 62/255 |

(Continued)

FOREIGN PATENT DOCUMENTS

WO        02/07902 A1    10/2002    ........... F25B/29/00

OTHER PUBLICATIONS

Babyak, Richard, "Getting Connected: Network News", Appliance Manufacturer, www.ammagazine.com, posted Aug. 16, 2000, pp. 1–10.*

"Sun Microsystems and Whirlpool Corporation Team Up to Build Networked Home Solutions: Efforts to Unite Broadband Technology with Home Appliances", Sun Microsystems Press Release, www.sun.com, pp. 1–3, Jan. 6, 2000.*

"Future Homes", Planet Save.Com, www.planetsave.com, pp. 1–3, Mar. 4, 2002.*

European Search Report EP 02022259 dated Jan. 21, 2003.

*Primary Examiner*—Ljiljana Ciric
(74) *Attorney, Agent, or Firm*—John F. Colligan; Robert O. Rice; Clifton G. Green

(57) ABSTRACT

A method of operating a refrigerated oven to cook a food item therein comprises the steps of A) determining the temperature of the cooking chamber in the refrigerated oven, B) producing cooled air in the refrigeration unit of the refrigerator oven for a first period of time if the temperature of the cooking chamber is below a predetermined threshold temperature and delaying production of cooled air in the refrigeration unit if the temperature of the cooking chamber is not below the predetermined threshold temperature, C) circulating the cooled air through a refrigerated air path to the cooking chamber to prevent spoilage of the food item, and, D) heating the cooking chamber to cook the food item in the cooking chamber by cycling the heating element for a second time period.

19 Claims, 19 Drawing Sheets

U.S. PATENT DOCUMENTS

| | | | | |
|---|---|---|---|---|
| 4,148,925 A | * | 4/1979 | Pettinato et al. | 426/523 |
| 4,167,585 A | * | 9/1979 | Caridis et al. | 426/523 |
| 4,195,098 A | * | 3/1980 | Otto | 426/524 |
| 4,225,204 A | | 9/1980 | Bellavoine | 312/236 |
| 4,232,053 A | * | 11/1980 | Blake | 426/523 |
| 4,250,955 A | | 2/1981 | Plattner et al. | 165/14 |
| 4,297,558 A | | 10/1981 | Inayama et al. | 219/10.55 R |
| 4,355,521 A | | 10/1982 | Tsai | 62/196 B |
| 4,457,140 A | | 7/1984 | Rastelli | 62/261 |
| 4,582,971 A | | 4/1986 | Ueda | 219/10.55 B |
| 4,791,861 A | | 12/1988 | Weinkle et al. | 99/357 |
| 4,876,426 A | * | 10/1989 | Smith | 426/523 |
| 4,884,626 A | | 12/1989 | Filipowski | 165/12 |
| 5,086,627 A | | 2/1992 | Borgen | 62/229 |
| 5,154,158 A | | 10/1992 | Lindsey | 126/9 |
| 5,254,823 A | * | 10/1993 | McKee et al. | 219/680 |
| 5,319,937 A | * | 6/1994 | Fritsch et al. | 62/3.62 |
| 5,326,578 A | * | 7/1994 | Yun | 426/524 |
| 5,347,827 A | | 9/1994 | Rudick et al. | 62/440 |
| 5,417,081 A | | 5/1995 | Rudick et al. | 62/440 |
| 5,503,300 A | | 4/1996 | Prescott et al. | 221/273 |
| 5,567,458 A | * | 10/1996 | Wu | 426/523 |
| 5,772,072 A | | 6/1998 | Prescott et al. | 221/121 |
| 5,875,645 A | | 3/1999 | Dunnigan | 62/407 |
| 6,070,424 A | | 6/2000 | Bauman et al. | 62/279 |
| 6,098,529 A | * | 8/2000 | Brummett et al. | 99/467 |
| 6,121,593 A | | 9/2000 | Mansbery et al. | 219/679 |
| 6,166,353 A | | 12/2000 | Senneville | 219/385 |
| 6,497,276 B2 | | 12/2002 | Clark et al. | 165/206 |
| 6,531,172 B2 | * | 3/2003 | Perrine | 426/523 |

* cited by examiner

TIME-BAKE CYCLE FOR A REFRIGERATED OVEN

BACKGROUND OF THE INVENTION

1. Field of the Invention

While previous refrigerated ovens attempt to address the problem of preventing the food from spoiling before the initiation of the bake cycle, they do not address the problem of maintaining the cooked food at a temperature suitable for serving after the completion of the Time-Bake cycle, which can result in the need to warm the cooked food if the user does not remove and serve the food immediately at the completion of the bake cycle, such as when the user unexpectedly had to work late or was delayed in arriving home.

2. Description of the Related Art

Ovens for cooking or baking foods are ubiquitous. While various ovens may have a variety of different features and cooking cycles, almost every contemporary oven includes a cooking chamber for receiving the food to be cooked and a heat source for heating the cooking chamber to a user-selected cooking temperature for a user-selected time-period. The heat source is normally one or more electric or gas heating elements positioned within the cooking chamber. Some ovens use a magnetron to generate microwaves as the heat source. A variety of controllers, including user input devices and displays, enable the user to input the preferred cooking temperature and cooking time.

A common cooking cycle is a Time-Bake cycle where the user can control the start time and stop time of the cooking cycle. A common application for the Time-Bake cycle is for cooking food while the user is away from the home, such as at work, and the cooking of the food will be completed at the anticipated arrival of the user at home, such as when the user returns home from work. The advantage of a Time-Bake cycle is that the user can cook the food without being present and have the food ready upon the user's anticipated time of arrival.

A disadvantage of the use of a Time-Bake cycle with an oven lies in that the cooking time for most food is substantially less than the amount of time the user is away, necessitating that the food be placed in the cooking chamber several hours before the start time of the cooking cycle. For example, most foods are cooked within 2–3 hours while most users work a traditional 8-hour day, excluding commute time, which requires that the food be placed in the cooking chamber at least five hours prior to the start time of the Time-Bake cycle. Not all food can be placed in the oven for long time periods without spoiling. Many types of food suitable for cooking in the oven require continuous refrigeration prior to cooking. These foods can spoil prior to the initiation of the start time of the Time-Bake cycle.

An attempt to solve the problem of food spoiling while placed in the cooking chamber during the delay prior to the start of the Time-Bake cycle included the addition of a refrigeration unit with the oven to cool the cooking chamber prior to the initiation of the bake cycle. Such a combination refrigerator oven is disclosed in U.S. Pat. No. 4,884,626 to Filipowski.

While previous refrigerated ovens attempt to address the problem of preventing the food from spoiling before the initiation of the bake cycle, they do not address the problem of maintaining the cooked food at a temperature suitable for serving after the completion of the Time-Bake cycle, which can result in the need to warm the cooked food if the user does not remove and serve the food immediately at the completion of the bake cycle, such as when the user unexpectedly had to work late or was delayed in arriving home. The Filipowski patent addresses the spoilage of the cooked food after the completion of the time-bake by starting a cooling cycle to refrigerate the cooked food upon the passing of a predetermined time from the completion of the time-bake as long as the oven door was not opened. However, the Filipowski patent does not address maintaining the cooked food at a temperature suitable for serving upon completion of the bake cycle.

There is an unfilled need for a refrigerated oven that not only protects the food from spoiling, both before and after the bake cycle, but also maintains the cooked food at a temperature suitable for serving after the completion of the bake cycle.

In addition to the shortcomings associated with the various cooking cycles, prior refrigerated ovens have structural shortcomings related to the inherent difficulties of combining a traditional refrigeration system with a traditional oven, which have antithetical functions: one heats and one cools. These problems can vary and most notably include: the difficulty of transferring the chilled air from the refrigeration unit into the cooking chamber, finding sufficient space in the standard-size oven for the refrigeration unit, and providing easy access to the refrigeration unit for maintenance.

An especially difficult problem related to incorporating a refrigeration unit with an oven is protecting the refrigeration system and its components from the high heat generated by the oven. This problem is exacerbated by the high temperatures attained during an oven cleaning cycle; these temperatures are approximately 850° F. Such heat creates an environment capable of damaging or negatively impacting the performance of a traditional refrigeration unit. For example, the temperature surrounding the refrigeration unit can be sufficiently great enough to negatively impact a traditional refrigeration system, which greatly reduces the life of the refrigeration unit or may cause the system to prematurely fail. Thus, the refrigeration unit must be capable of functioning properly when placed in close proximity to the self-cleaning oven.

SUMMARY OF THE INVENTION

The invention relates to a method of operating a refrigerated oven to cook a food item placed therein. The refrigerated oven is comprised of several components such as a cooking chamber having a heating element for heating the cooking chamber, a refrigeration unit for cooling the cooking chamber, a temperature sensor for sensing the temperature of the cooking chamber, a data input device for inputting user-selected cooking cycle parameters, and a controller operably coupling and controlling the components of the refrigerated oven to selectively actuate heating element and the refrigeration unit in response to the sensed temperature to thereby implement the method as defined by the cooking cycle parameters.

The method comprises the steps of: A) cooling the cooking chamber to prevent the spoiling of the food item in the cooking chamber by cycling the refrigeration unit for a first time period; B) heating the cooking chamber to cook the food item in the cooking chamber by cycling the heating element for a second time period; and C) delaying the initiation of step A until the temperature of the cooking chamber cavity is below a predetermined threshold temperature. Preferably, the predetermined threshold temperature is about 170 degrees F.

The operation of the refrigerated oven is preferably terminated if the initiation of step A is delayed beyond the predetermined time. Preferably, during the cooling of the cooking chamber, the temperature is maintained at a first predetermined temperature, which is preferably set by the controller. During the cooking of the food item, the temperature of the cooking chamber is maintained at a second predetermined temperature, which is preferably inputed by the user.

After the completion of cooking step B, the cooking chamber is heated to maintain the food item at a temperature suitable for serving upon removal from the cooking chamber by cycling the heating element for a third time period. During this warming of the food item, the cooking chamber is preferably maintained at a third predetermined temperature, which is preferably set by the controller. Preferably, the warning step is automatically initiated at the end of the cooking step and is terminated upon the opening of the oven door.

The first time period can be determined based on at least one cooking cycle parameter inputted by a user. Preferably, two cooking cycle parameters are inputted, an End Time, corresponding to the time that the bake cycle is to be completed, and a Bake Time, corresponding to the length of time for cooking the food item. The first time period is determined by subtracting the Bake Time from the End Time. The second time period is preferably set equal to the Bake Time.

The cooling step can include several sub-steps. For example, if the temperature of the cooking chamber does not cool down to a predetermined threshold within a predetermined time period, the cooling step can be terminated.

An optional second cooling step can follow the warming step. The second cooling step preferably is initiated after the warming step and then activated for a predetermined time period. The second cooling step can be terminated upon the opening of the oven door.

In a second embodiment, the invention relates to a method of operating a refrigerated oven to cook a food item therein. The refrigerated oven comprises a cooking chamber having a heating element for heating the cooking chamber in combination with a refrigeration unit for cooling the cooking chamber. A temperature sensor is provided for sensing the temperature of the cooking chamber. A data input device is provided for inputting user-selected cooking cycle parameters. A controller operably couples the heating element, refrigeration unit, temperature sensor, and the data input device to selectively actuate the heating element and the refrigeration unit in response to the sensed temperature to implement the method as defined by the cooking cycle parameters.

The method includes the steps of: A) cooling the cooking chamber to prevent the spoiling of the food item in the cooking chamber by cycling the refrigeration unit for a first time period; B) heating the cooking chamber to cook the food item in the cooking chamber by cycling the heating element for a second time period; and C) terminating step A if the cooking chamber does not reach a predetermined threshold temperature within a predetermined time period. Preferably, the predetermined threshold temperature is 40° F.

The method can further include after the completion of step B, a step D comprising the heating the cooking chamber to maintain the food item at a temperature suitable for serving upon removal from the cooking chamber by cycling heating element for a third time period. Step D is preferably automatically initiated after step B and terminates upon the opening of the oven door. An optional cooling step E can follow the warming step D. The cooling cycle step E is preferably automatically initiated after step D and terminates upon the opening of the oven door.

In yet another embodiment, the invention relates to a time-bake cooking cycle for a refrigerated oven used to cook food items therein. The refrigerated oven comprises several components such as a cooking chamber having a heating element for heating the cooking chamber, a refrigeration unit for cooling the cooking chamber, a temperature sensor for sensing the temperature of the cooking chamber, a data input device for inputting user-selected cooking cycle parameters, and a controller operably coupling and controlling the components of the refrigerated oven to selectively actuate heating element and the refrigeration unit in response to the sensed temperature to thereby implement the time-bake cooking cycle as defined by the cooking cycle parameters.

The time-bake cooking cycle comprises: a cool cycle, a bake cycle, and a warm cycle. During the cool cycle, the temperature of the cooking chamber is maintained at a first predetermined temperature to prevent the spoiling of the food item in the cooking chamber. The bake cycle maintains the temperature of the cooking chamber at a temperature sufficient to cook the food item in the cooking chamber. During the warm cycle, the temperature of the cooking chamber is maintained a temperature suitable for serving the food item upon removal therefrom and is terminated upon the opening of the oven door.

The cool cycle, bake cycle and warm cycle are preferably sequentially initiated. The bake cycle can be automatically initiated after the completion of the cool cycle. The warm cycle can be automatically initiated after the completion of the bake cycle. An optional second cool cycle can follow the warm cycle, and can be terminated upon the opening of the oven door. Similarly, the warm cycle can also be terminated upon the opening of the other door.

A data input cycle is preferably provided to permit user-defined operating parameters to be stored in the controller. Preferably, the user-defined operating parameters comprise an End Time, representing the time of day that the cooking of the food is to be completed, and a Bake Time, representing the length of time to cook the food. The bake cycle is preferably initiated at the time of day corresponding to the End Time minus the Bake Time.

The initiation of the cool cycle can be delayed as long as the temperature of the cooking chamber is above the predetermined threshold temperature. Preferably, the time-bake cooking cycle is aborted if the temperature of the cooking chamber remains above the predetermined threshold temperature for a predetermined time period. The cool cycle can also be terminated if the temperature of the cooking chamber does not fall below a predetermined threshold temperature after a predetermined time period.

DESCRIPTION OF THE PREFERRED EMBODIMENT

Figure 1:
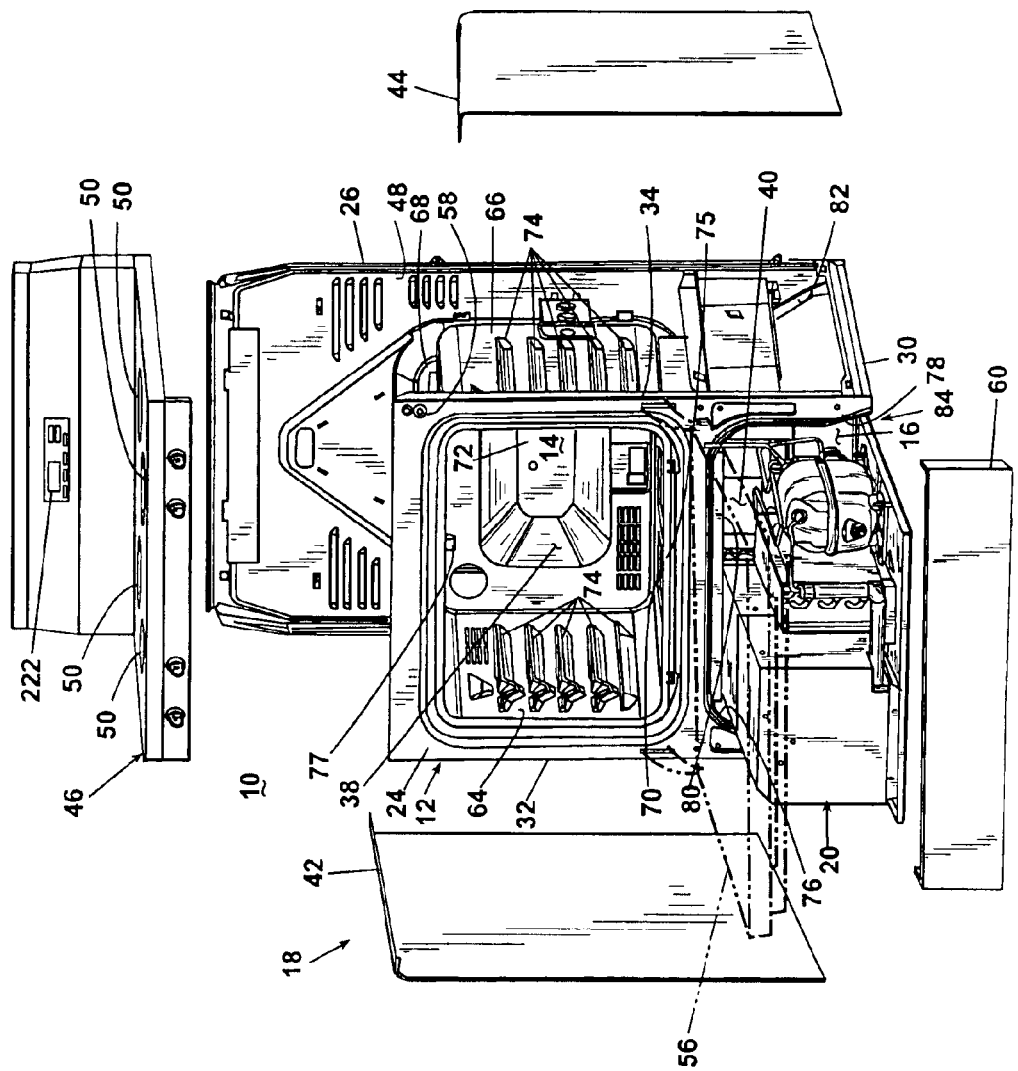
FIG. 1 is an exploded perspective view of the refrigerated oven according to the invention and illustrates the chassis or frame of the oven in which are formed a cooking chamber and a refrigeration unit chamber, with a door (shown in phantom) for closing the cooking chamber shown in an open position, a modular refrigeration unit partially inserted within the refrigeration unit chamber, and a cover for the refrigeration unit chamber.
Figure 2:
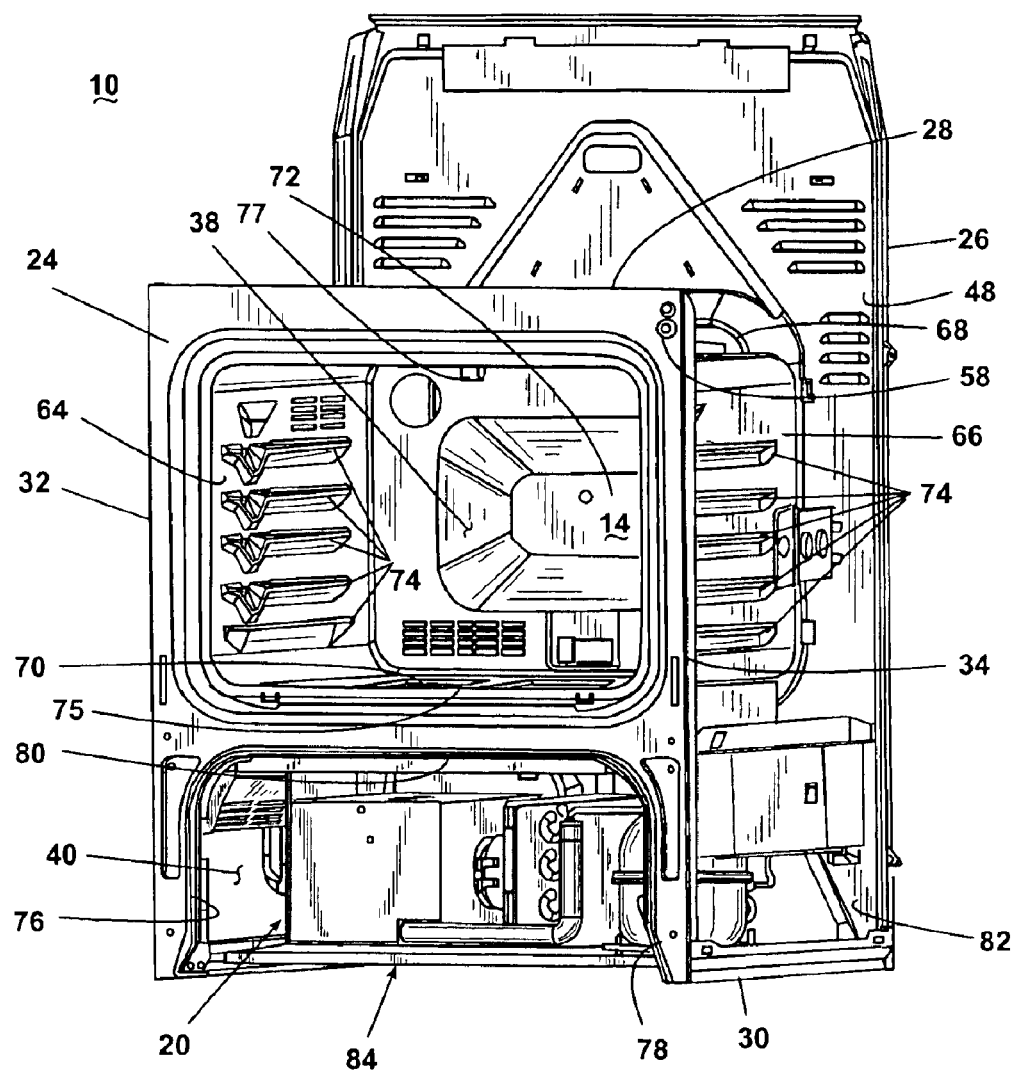
FIG. 2 is a perspective view of the chassis with the modular refrigeration unit inserted within the refrigeration unit chamber.
Figure 3:
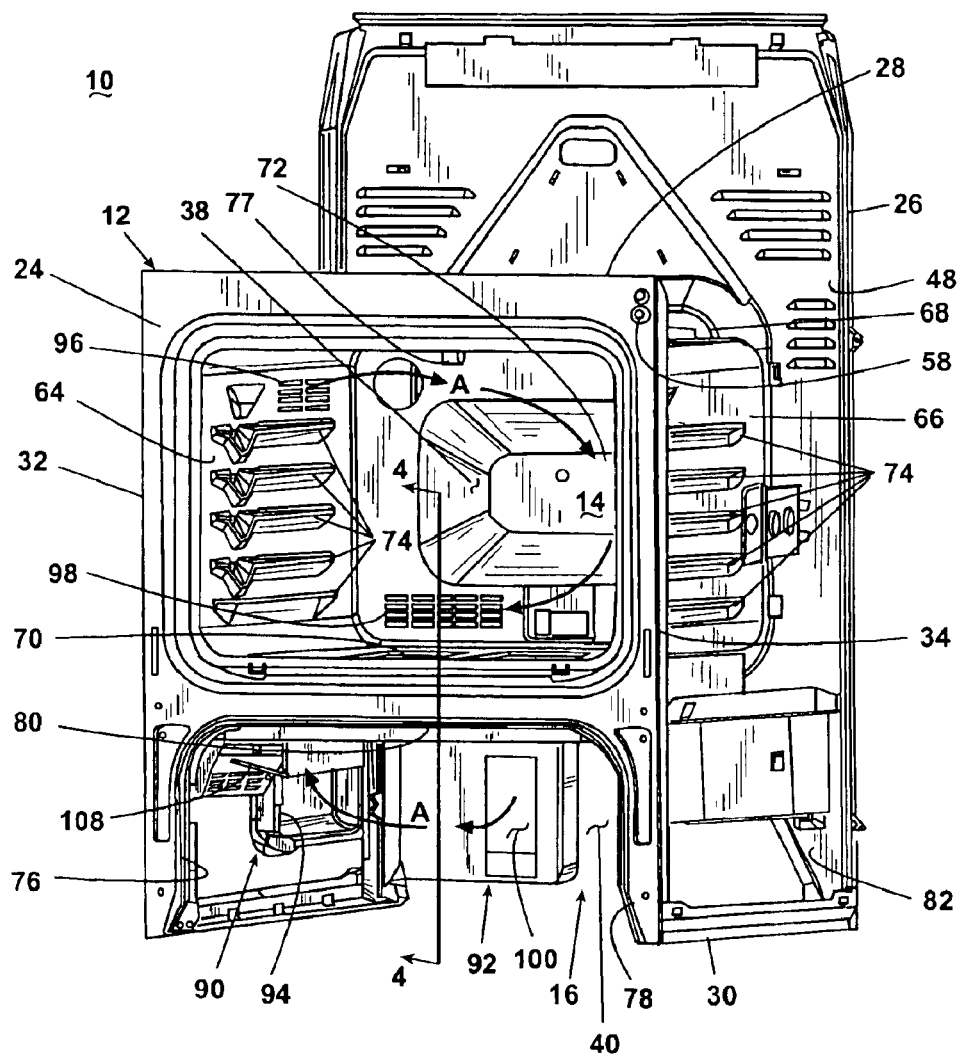
FIG. 3 is a perspective view identical to FIG. 2 except the modular refrigeration unit is not shown to better illustrate cold air and return ducts fluidly connecting the cooking chamber and the refrigeration unit chamber.

FIGS. 1–3 illustrate the refrigerated oven 10 according to the invention and comprising a chassis or frame 12 that defines a cooking chamber 14 and a refrigeration unit chamber 16, which are arranged in a stacked configuration with the refrigeration unit chamber 16 positioned below the cooking chamber 14. An external skin or cabinet 18 is mounted to the frame 12 and forms a decorative exterior for the refrigerated oven 10. A modular refrigeration unit 20 is slidably received within the refrigeration unit chamber 16.

The frame 12 functionally comprises a front 24, rear 26, top 28, bottom 30, and opposing sides 32, 34. The cooking chamber 14 and the refrigeration unit chamber 16 both have open faces 38, 40, respectively, which open onto the front 24 of the frame 12.

The cabinet 18 preferably comprises decorative side panels 42, 44 and top panel 46, which overlay the corresponding sides 32, 34 and top 28 of the frame 12, respectively. The rear 26 and bottom 30 of the frame 12 are not typically covered by a decorative panel. A rear panel 48 typically overlies and covers the rear 26 of the frame 12. While not germane to the invention, a series of burners 50 are disposed on the top 28 of the frame 12 and extend through corresponding openings in the top panel 46. The burners collectively form a cooktop.

An oven door 56 (shown in phantom in an open position) is hingedly mounted to the front 24 the frame 12 and is movable between an open and a closed position. In the open position, the door 56 is removed from the open face 38 of the cooking chamber 14 and provides access to the interior of the cooking chamber 14. In the closed position, the door 56 overlies the open face 38 and blocks access to the interior of the cooking chamber 14. A door position sensor 58, illustrated as a spring-biased, push-button switch, is provided on the front 24 of the frame. When the door is in the closed position, the push-button switch is depressed to indicate the door is closed.

A cover 60 for the refrigeration unit chamber 16 is removably mounted to the front 24 of the frame 12 and closes the open face 40 of the refrigeration unit chamber when mounted to the frame 12. The cover 60 can be removed to gain access to the modular refrigeration unit contained within the interior of the refrigeration unit chamber 16.

The cooking chamber 14 comprises opposing side walls 64, 66 that are connected along their upper and lower edges by an upper wall 68 and lower wall 70, respectively. A rear wall 72 closes the rear of the cooking chamber 14 opposite the open face 38. A series of shelf supports 74 are formed in each of the side walls 64, 66 and are used in pairs to support one or more shelves (not shown) mounted within the cooking chamber 14.

A heating element 75, illustrated as gas heating element, is positioned within the cooking chamber 38 adjacent the bottom wall 70. The type of heating element is not germane to the invention. Any type of heating element can be used, including electric or gas heating elements, for example. There can also be multiple heating elements positioned within the cooking chamber 38. If multiple heating elements are used, traditionally, one is placed adjacent the lower wall 70 and the other is place adjacent the upper wall 68. A temperature sensor 77 (FIGS. 2 and 10) is also positioned within the cooking chamber 38 for monitoring the temperature therein.

The refrigeration unit chamber 16 functionally has the same configuration as the cooking chamber 14 in that the frame functionally defines side walls 76, 78, whose upper edges are connected by a top wall 80, and whose rear edges are connected by a rear wall 82 to thereby form a chamber with an open face 40 and an open bottom 84. Typically, the top wall 80 of the refrigeration unit chamber 16 is spaced from the lower wall 70 of the cooking chamber 14 and the heating element 75 is disposed therebetween.

Figure 4:
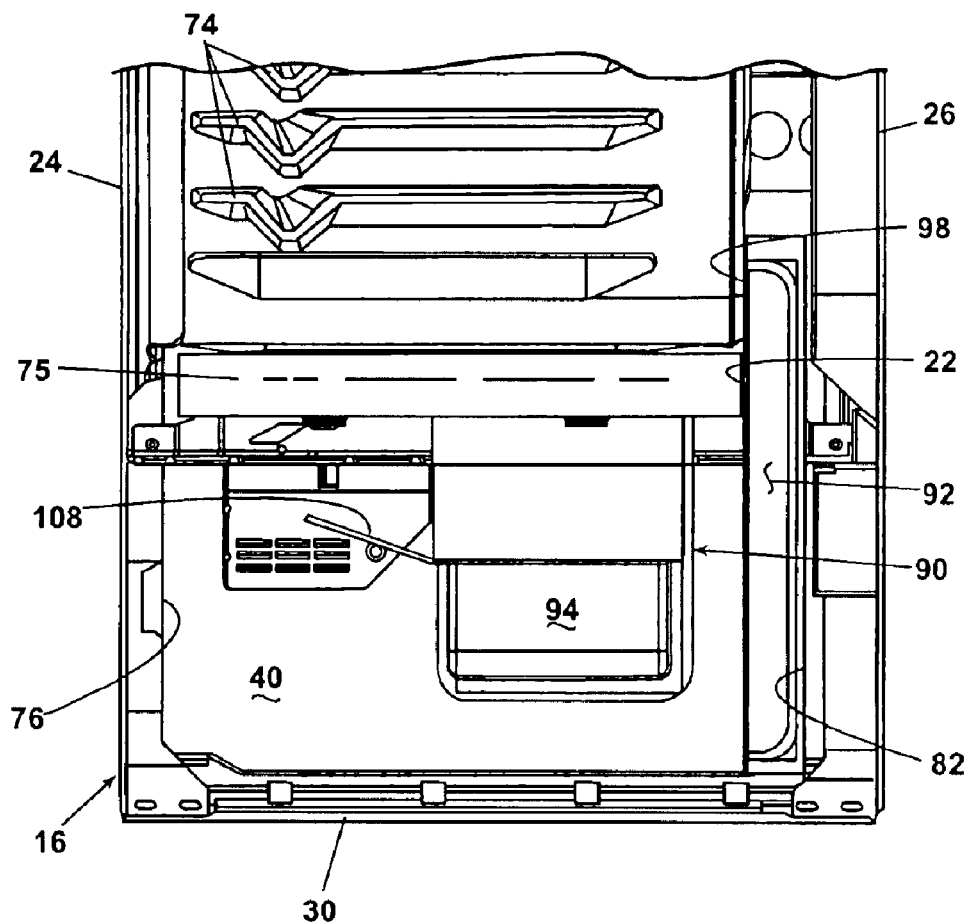
FIG. 4 is a sectional view taken along line 4—4 of FIG. 3 illustrating the cold air and return ducts.
Figure 5:
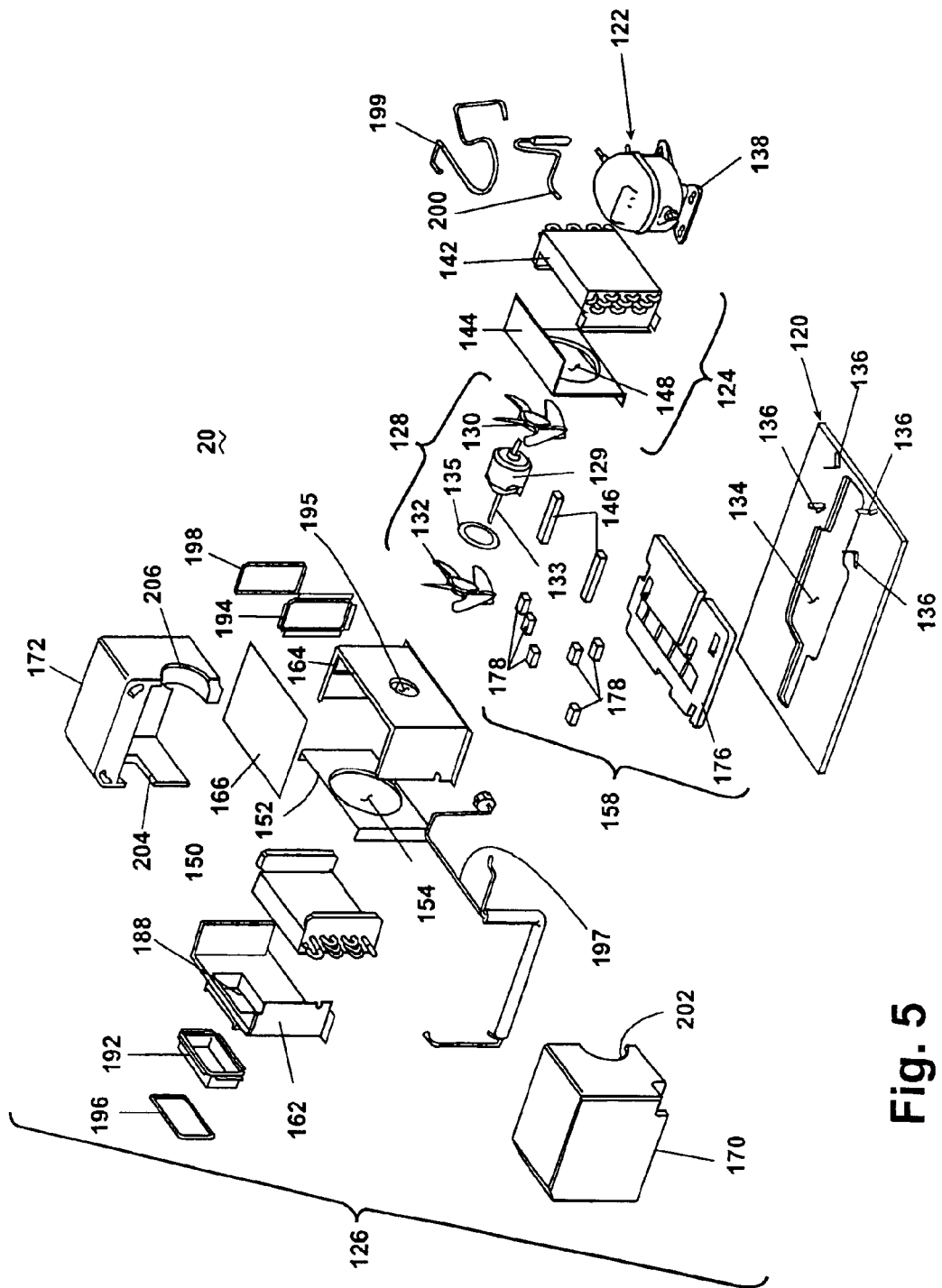
FIG. 5 is an exploded view of the modular refrigeration unit shown in FIG. 1 and illustrating the components of the modular refrigeration unit mounted to a base.
Figure 6:
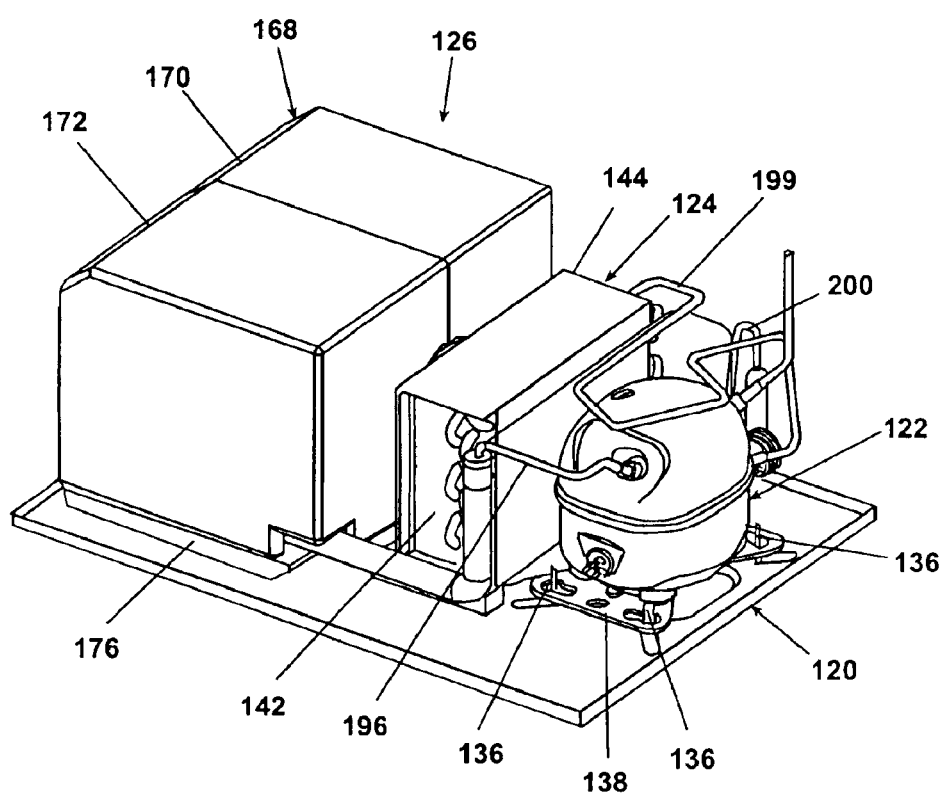
FIG. 6 is a right-front perspective view of the assembled modular refrigeration unit with an insulation cover placed over an evaporator assembly.
Figure 7:
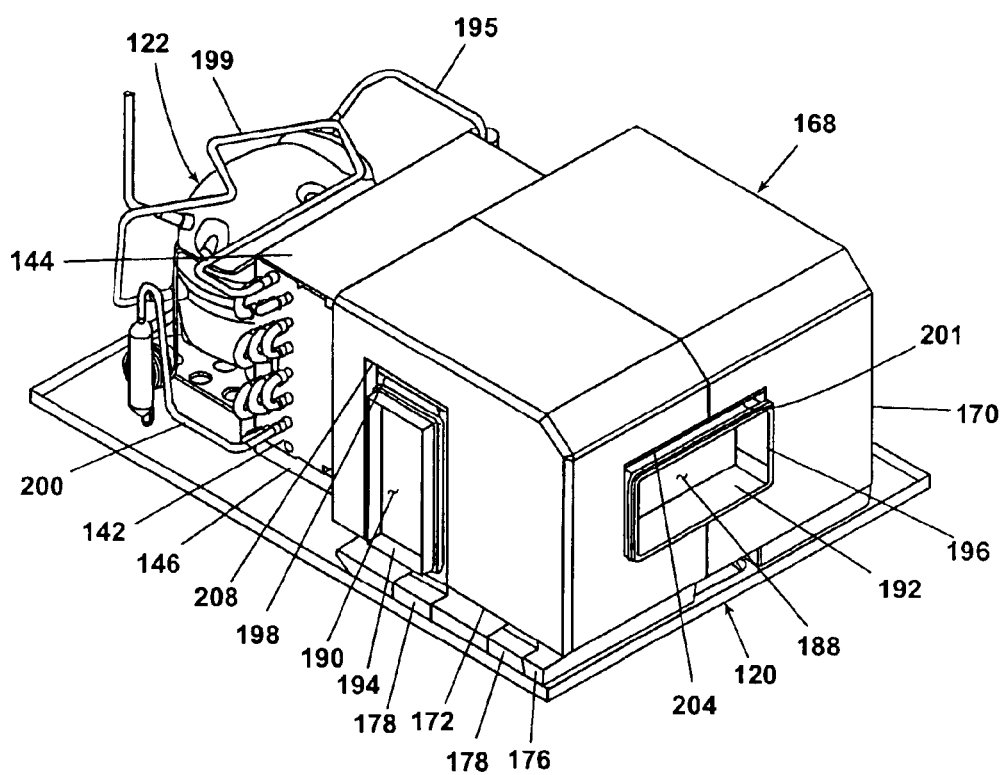
FIG. 7 is a left-rear perspective view of the assembled modular refrigeration unit and illustrates the cold air and return air openings in the insulation cover.
Figure 8:
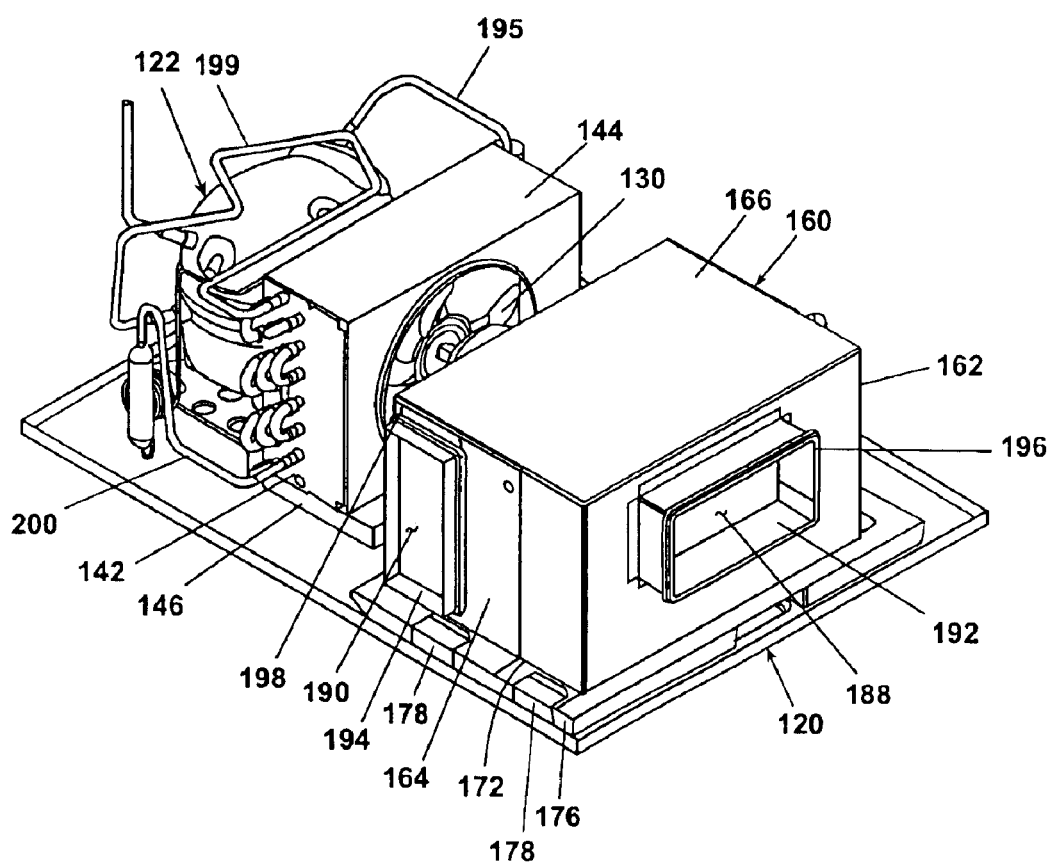
FIG. 8 is identical to FIG. 6, except that the insulation cover is removed to illustrate the evaporator assembly, including an insulation pad.

Referring to FIGS. 3 and 4, the cooking chamber 14 and refrigeration unit chamber 16 are fluidly connected by a cold air duct 90 and a return duct 92. An inlet 94 for the cold air duct 90 is located on the side wall 76. An outlet 96 for the cold air duct 90 is located on the side wall 64 of the cooking chamber 14 at an upper portion thereof and at the junction of the side wall 64 with both the rear wall 72 and the top wall 68. An inlet 98 for the return duct 92 is located at a lower portion of the rear wall 72 for the cooking chamber 14 at the junction of the rear wall 72 with the side wall 64 and the bottom wall 70. An outlet 100 for the return air duct 92 is located in the rear wall 82 of the refrigeration unit chamber 16.

The location of the cold air duct 90 and the return duct 92 and their corresponding inlets and outlets result in an air flow circulation path, hereinafter referred to also as a "refrigerated air path," identified by the flow lines A. Assuming the air flow began at the inlet to the cold air duct 90, the air flow circulation path A will proceed (in a clockwise motion as viewed in FIG. 3) through the cold air duct 90 and enter the cooking chamber 14 through the cold air duct outlet 96 where it is directed toward the opposing side wall 66. Ultimately, the cold air entering the cooking chamber 14 through the cold air duct outlet 96 will enter the inlet 98 to the return air duct 92 and exit the return air duct outlet 100, where the air is once again chilled by the modular refrigeration unit 20 and re-circulated.

The location of the cold air duct outlet 96 and the return duct inlet 98 enhances the circulation of the cold air around the cooking chamber 14. First, the force of the cold air exiting the cold air outlet 96 will inherently direct the cold air toward the opposing side wall 66 where, upon contact with the side wall 66, the cold air will be deflected back towards the side walls 64 and the return air duct inlet 98. Second, the cold air exiting the cold air duct outlet 96 is typically colder and more dense than the air in the cooking chamber 14, the denser cold air will inherently fall towards the bottom wall 70 of the cooking chamber 14. Since the cold air duct outlet 96 is located at the top of the cooking chamber 14, the naturally denser cold air exiting the cold air duct outlet 96 will automatically generate circulation from the top toward the bottom of the cooking chamber 14. Third, the modular refrigeration unit 20 forms a relatively low pressure in the return duct 92, which naturally draws the already redirected and falling cold air toward and into the return duct inlet 98.

The return duct outlet 100 has a generally rectangular shape and faces the open face 40 of the refrigeration unit chamber 16. The cold air inlet 94 is generally orthogonal to the open face 40. A side portion 108 of the cold air duct 90 is movably mounted to the remainder of the duct. The side portion 108 is preferably hingedly mounted to the cold air duct 90 by any suitable method. For example, the side portion 108 could be a separate piece of material having an upper end that is taped to the cold air duct. Alternatively, since the cold air duct is preferably made from thin metal such as sheet metal, the side portion 108 could be an elongated tab cut from cold air duct 90 and the hinge is formed by bending the tab relative to the rest of the duct.

Referring to FIGS. 5–8, the modular refrigeration unit 20 comprises a base 120 on which are mounted a compressor 122, condenser assembly 124, an evaporator assembly 126, and a dual-blade fan 128, which is shared by the condenser assembly 124 and evaporator assembly 126. Since all of the components for the modular refrigeration unit 20 are mounted on the base 120, the modular refrigeration unit 20 is easily slid into and out of the refrigeration unit chamber 16 to simplify the installation and maintenance of the modular refrigeration unit 20.

The dual-blade fan 128 includes a motor 129 with a shaft 133. A compressor blade 130 and an evaporator blade 132, each mount on the shaft 133. A thermally non-conductive spacer 135 separates the motor 129 from the evaporator assembly 126 to thermally isolate the evaporator assembly from the fan motor 129. Although not shown as such in FIG. 5, the evaporator blade 132 is received within the evaporator assembly 126 when assembled.

Figure 9:
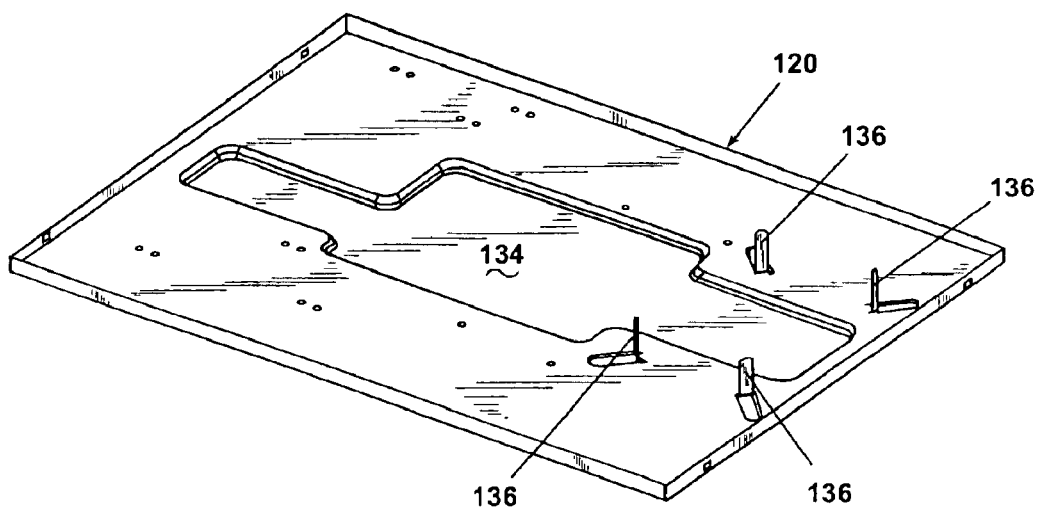
FIG. 9 is a perspective view of the base of the modular refrigeration unit with an integrally formed evaporator pan.

Referring to FIG. 9 specifically and to FIGS. 5–8 generally, the base 120 is preferably made from a thermally conductive material, such as stainless steel, for example. An evaporator pan 134 is formed in the base 120. The evaporator pan 134 is preferably a depression formed in the base 120, such as by a press. However, the evaporator pan 134 could be a separate piece mounted to the base 120, including mounted to a corresponding opening in the base 120. Compressor mounting fingers 136 extend upwardly from the base 120 and cooperate with the compressor 122 to mount the compressor to the base 120.

As illustrated, the compressor mounting fingers 136 are formed by cutting and bending portions of the base. Is also contemplated that separate fingers 136 can be affixed to the base if and when it is not desirable to have openings in the base, such as when it is desired to use the entire base as the evaporator pan 134. The outer edges of the base 120 turn upwardly to form a peripheral rim about the base 120 to aid in retaining any liquid overflow from the evaporator pan 134.

Referring to FIGS. 5–8, the compressor 122 is a traditional compressor and any suitable compressor can be used for the invention. A suitable compressor is a hermetic reciprocating compressor manufactured by Embraco, model EM65. The compressor sets on a mounting bracket 138 that has openings for receiving the compressor mounting fingers 136 to thereby secure the compressor 122 to the base 120.

The condenser assembly 124 comprises a condenser 142 and fan shield 144, which includes a fan opening 148 through which passes the condenser fan blade 130. Both of the condenser 142 and fan shield 144 are mounted to the base 120 by heat conductive spacers, such as aluminum spacers 146, which conduct the heat from the condenser 142 to the base 120. Since the condenser 142 rejects a substantial amount of heat during the refrigeration cycle, the heat is immediately conducted to the base 120, including the evaporator pan 134, to aid in the evaporation of any water in the evaporator pan 134. The use of the conducted condenser heat to evaporate the liquid in the evaporator pan 134 is enhanced by the evaporator pan being made from a thermally conductive material.

The evaporator assembly 126 comprises an evaporator 150 and a fan shield 152, which includes a fan opening 154 through which the fan blade 132 is received. A mount 158 thermally isolates and connects the evaporator 150 and the fan shield 152 to the base 120. A housing 160, comprising opposing side portions 162, 164 and top wall 166, overlies the evaporator 150 and the fan shield 152 and rests on the mount 158 to enclose the evaporator 150 and fan shield 152. An insulation box 168 overlies the housing 160 and comprises complementary halves 170, 172, which are slidably coupled to encase the housing 160.

The mount 158 is preferably thermally non-conductive to prevent the heat of the base 120 from being conducted to the evaporator 150. The mount 158 preferably comprises an insulation pad 176 and spacers 178, which are received within openings or recesses in the insulation pad 176. The spacers 178 are arranged in two triangular sets. The inner-most spacers of each set connect the evaporator 150 to the base and the remaining spacers connect the side portions 162, 164 to the base the 20. The spacers are preferably made from Nylon and the insulation pad 176 is preferably made from expandable foam.

Figure 10:
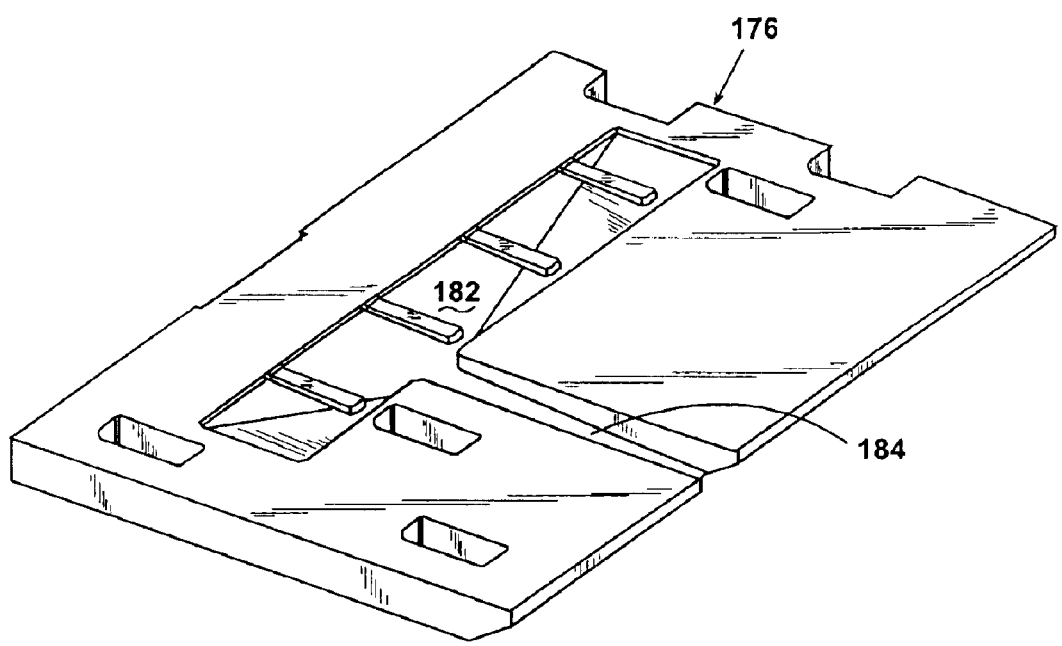
FIG. 10 is a perspective view of the insulation pad for insulating an evaporator from a base of the modular refrigeration unit, with the insulation pad forming a condensation catch pan and a drain channel.

Referring specifically to FIG. 10 and generally to FIGS. 5–8, the insulation pad 176 comprises several topographical features that perform important functions for the invention. A recess forming a catch pan 182 is formed in the upper surface of the insulation pad 176 at a location below where coils for the evaporator 150 will be located when the evaporator 150 is mounted. Thus, any condensation dripping from the coils of the evaporator will fall into the catch pan 182. An open-top channel 184 extends from the catch pan 182 through a peripheral edge of the insulation pad 176. The channel 184 slopes downwardly from the catch pan 182 to the peripheral edge and carries away any liquid collecting in the catch pan 182 and directs it to the evaporator pan 134.

Advantageously, the insulation pad 176 is mounted to the base 120 such that the channel 184 extends between the fan blades 130, 132. The airflow generated by the fan blades 130 passes below the insulation pad and aids in evaporating any liquid in the evaporator pan sump 134. The condenser fan blade 130 is especially helpful in evaporating water in the evaporator pan 134 since the condenser fan blade 130 draws the warm air from the condenser across the evaporator pan 134.

The side portions 162, 164 of the housing 160 each include an opening 188, 190, through which is inserted a peripheral flange 192, 194, respectively. A peripheral seal 196 and peripheral gasket 198 encircle the flanges 192, 194, respectively. The peripheral flanges 192, 194 are adapted to mate with the cold air duct inlet 94 and the return outlet 100, respectively, to fluidly couple the interior of the housing 160 with the cold air duct 90 and return duct 92.

The seal 196 and gasket 198 are located on the flanges 192, 194 such that they fluidly seal the evaporator housing 160 with respect to the cold air duct 90 and return duct 92 upon the sliding insertion of the modular refrigeration unit 20 within the refrigeration unit chamber 16. Specifically, the peripheral flange 194 is received within the outlet 100 of the return air duct 92 and the gasket 198 is compressed between the housing side wall 164 and the duct 92 to form a fluid seal therebetween. The seal 196 is slidably received within the open side edge of the cold air duct 90 formed by the hinged movement of the side portion 108 to an open position. When the modular refrigeration unit is completely received within the refrigeration unit chamber 16, the seal 196 abuts the inner edge of the inlet 94. The side portion 108 is then hinged to a closed position where it overlies the seal 196 and the side portion 108 is then secured to the return duct 192, preferably by a suitable fastener such as a pop in rivet or a screw.

The side portion 164 includes a fan shaft opening 195 that is sized to receive the shaft 133 from the fan 128. A thermally non-conductive spacer 135 is positioned between the side portion 164 and the fan 128 to minimize the fan 128 from conducting heat to the side portion 164 and thereby prevent the heat from negatively impacting the performance of the evaporator 150.

The peripheral flange 194 and its corresponding opening 190 are positioned within the side portion 164 such that they are upstream of the airflow generated by the evaporator fan blade 132. Correspondingly, the flange 192 and its corresponding opening 188 are positioned in the side portion 162 such that they are downstream of the airflow generated by the evaporator fan blade 132. Therefore, the evaporator assembly 126 in combination with the cold air duct 90, return duct 92, and cooking chamber 14 define a chilled airflow path along previously described flow lines. Thus, the air flow generated by the evaporator fan blade 132 that passes through the evaporator 150, the cold air duct 90, the cooking chamber 14, the return duct 92, and back to the evaporator assembly 126.

In a traditional manner, the output-side of the condenser 130 is connected to the input-side of the evaporator 150 through a capillary tube 197 to permit the build up of pressure in the condenser 130 so that the condenser 130 can convert the refrigerant gas into a liquid. Also, the output-side of the evaporator 150 is connected by a conduit 199 to the input-side of the compressor 122. The output-side of the compressor is connected to the input-side of the condenser through a conduit 200. The connection and operation of the compressor 122, condenser 130, and evaporator 150 of the modular refrigeration unit 20 are traditional and well-known, they will not be described in further detail.

The opposing halves 170, 172 of the insulation box 168 are preferably shaped to conform to the shape of the housing 160 while having appropriate openings to permit the passage of the various connectors for the compressor 122, condenser 130, and evaporator 150. The insulation half 170 comprises a partial cold air duct opening 201 and partial fan opening 202. Similarly, the insulation half 172 comprises corresponding partial cold air duct opening 204 and partial fan opening 206, along with return duct opening 208. When the insulation halves 170, 172 are assembled over the housing 160, the partial cold air duct openings 200, 202 cooperate to encircle the peripheral flange 192 associated with the cold air duct 90, the openings 202, 206 cooperate to encircle the fan 128, and the return duct opening 208 encircles the peripheral flange 194 associated with the return duct 92.

An advantage of the two-half insulation box 168 is that it is easily assembled over the housing 160 and can be unassembled as needed for maintenance.

The modular refrigeration unit 20 has a variety of features whose function enables the useful operation of the modular refrigeration unit 20 in the high temperature environment associated with the refrigerated oven 10. One general category of features relate to the thermal isolation of the evaporator assembly 126 from the other components of the modular refrigeration unit 20 and from the rest of the refrigerated oven 10. The features include the thermally non-conductive mount 176 that physically separates and thermally isolates the evaporator assembly 126 generally and the evaporator 150 specifically from the base 120, which is advantageously used as a heat exchanger to dissipate heat from the condenser. The fan spacer 135 also functions to thermally isolate the evaporator assembly 126 from any heat that could be conducted through the fan 128 if it were to contact of the side portion 164 of the housing 160. Additionally, the insulation box 168 thermally isolates all but the bottom of the evaporator assembly 126 from the rest of the refrigerated oven 10, including the modular refrigeration unit 20. The collective thermally-isolating effect of all of these structural features permit the useful operation of the modular refrigeration unit 20 and the high temperature environment of an oven. Without the thermally-isolating features, the performance of the evaporator 150 could be substantially impaired in the high temperature environment.

In addition to the thermally isolating features, the invention also addresses the higher than normal condensation that can exist when a refrigeration unit is used in a high temperature environment. Even though the evaporator 130 is insulated from the surrounding heat, the insulation cannot stop all heat reaching the evaporator. The generally higher ambient temperature surrounding the evaporator will increase the amount of condensation that must be removed. To handle the increased condensation, the catch pan 182 and channel 184 of the insulation pan 176 direct the liquid condensate from the evaporator directly onto the base 120 for evaporation. Since the base 120 functions as a heat exchanger, the additional heat carried by the base 120 in performing the heat-exchanging function also advantageously increases the rate of evaporation for the liquid condensate carried on the evaporation pan 134 of the base 120. The location of the condenser fan blade 130 with respect to the insulation pan 176 and base 120 also aids in evaporating the liquid condensate on the base 120 and the air flow created by the condenser fan 130 is drawn below the evaporator pan 134 from the condenser 130. This particular air flow path will result in an increased rate of evaporation for the liquid condensate in or the evaporator pan 134.

To the extent the additional heat can be reduced, the resulting consequences described above will be minimized. Thus, the modular refrigeration unit 20 also includes several special features that relate to the dissipation of heat. The condenser 130 is directly connected to the thermally-conductive base 120 by thermally-conductive spacers 146 to aid in distributing the heat from the condenser to the base 120, which functions as a heat exchanger. The thermally conductive spacers 146 improve the rate of conduction from the condenser to the base. And, the size of the base improves the dissipation of the conducted heat. Collectively, these features dissipate the heat from the condenser relatively quickly to reduce the heat convected to the surrounding air.

The many structures of the modular refrigeration unit 20 that permit it to thermally isolate the evaporator from the surrounding high temperature environment, to remove the generated condensation, and to dissipate the condenser heat, make the modular refrigeration unit 20 uniquely suited for the environment found in a refrigerated oven.

Figure 11:
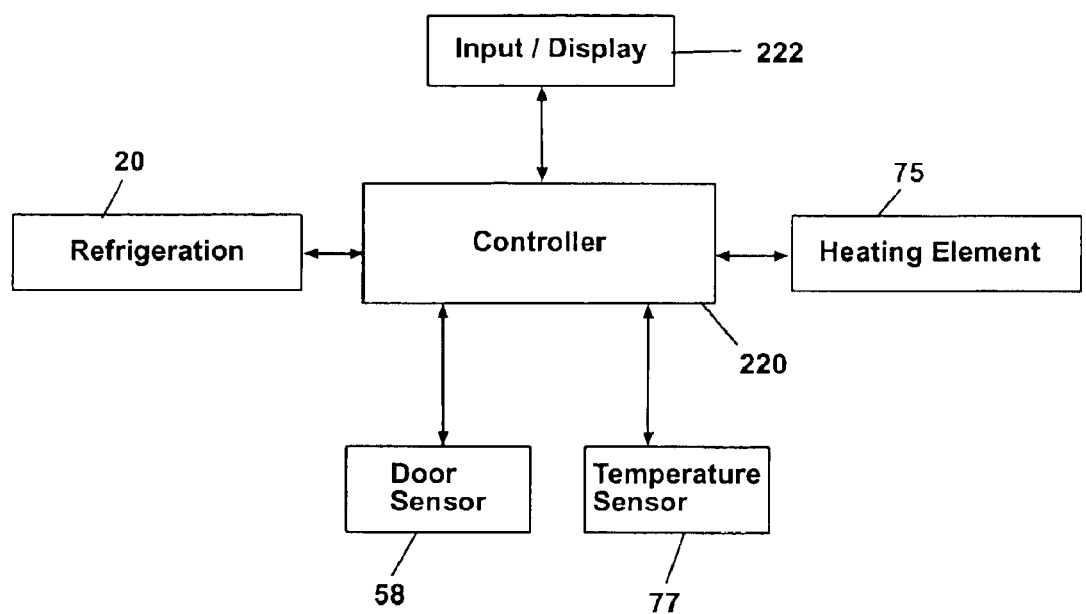
FIG. 11 is a schematic of a generic controller for controlling the operation of the oven heating element and refrigeration unit in response to temperature sensor input and user-selected input received by the controller from an input/display device.

FIG. 11 illustrates one possible controller 220 for controlling the operation of the refrigerated oven 10 in accordance with a preferred cycle. The controller 220 preferably is a microprocessor-based controller that has programmable read-only memory in addition to the programmable memory of the microprocessor. The controller 220 typically will include an oscillator or other device that can be used as a clock to monitor the time of any aspect of the operation of the refrigerated oven 10.

An input/display device 222 is provided and functions as a user interface for the user to input operational parameters for the refrigerated oven 10 as needed. The input/display device 222 also contains a display whereby the controller 220 can display to the user information or data necessary to operate the refrigerated oven 10 and all of the parameters needed to perform a particular cycle or function. The input/display device 222 can be any suitable such device. One of ordinary skill in the oven art is aware of many mechanical, electrical, or electro-mechanical input/display devices that can be used for the invention. Such input/display devices can range from simple manually-operated knobs or dials having information, such as time or temperature imprinted thereon, and which are set relative to a reference point to a catch-panel input device in combination with an LCD or other type of display.

The particular structure or type of controller 220 and input/display device 222 are not germane to the invention and therefore will not be described in greater detail.

The controller 220 is operably connected to the heating element 75 contained in the cooking chamber 14 of the modular refrigeration unit 20. The controller is also connected to the temperature sensor 77 and the door sensor 58. The controller 220 selectively cycles the heating elements and the modular refrigeration unit in response to the selected operating cycle as defined by the operational parameters stored in the memory of the controller or input and by the user through the input/display device 222 and further in response to the temperature sensed by the temperature sensor.

FIGS. 11–19 illustrate a preferred operating cycle 300 for use with the previously described refrigerated oven 10. For purposes of this description the preferred operating cycle is in the genre of Time-Bake cycles. Also for purposes of this description, all of the operating parameters, whether stored in the memory of the controller or entered by the user, are generically referred to as predetermined, indicating a value is set or has been set for the parameter, even if the value is variable or dynamic.

The major steps or cycles of the preferred Time-Bake cycle for the refrigerated oven 10 begin with a Data_Input step 302 in which any necessary user-defined data is input to the controller 220. The Data_Input step 302 is followed by the Cool_Cycle 304 where the modular refrigeration unit 20 is cycled to maintain the cooking chamber 14 at a temperature sufficient to prevent any food placed therein from spoiling before the initiation of the Bake_Cycle 306, which follows the Cool_Cycle 304. The Bake_Cycle 306 can be any type of Bake_Cycle. A preferred Bake_Cycle 306 is disclosed in U.S. patent application Ser. No. 09/838,447, the disclosure of which is incorporated by reference. The Bake_Cycle 306 is followed by a Warm_Cycle 308 that maintains the cooked food at a temperature suitable for serving upon removal from the cooking chamber 14. An optional Cool_Cycle 310, preferably substantially similar to the Cool_Cycle 304, can follow the Warm_Cycle 308.

Figure 12:
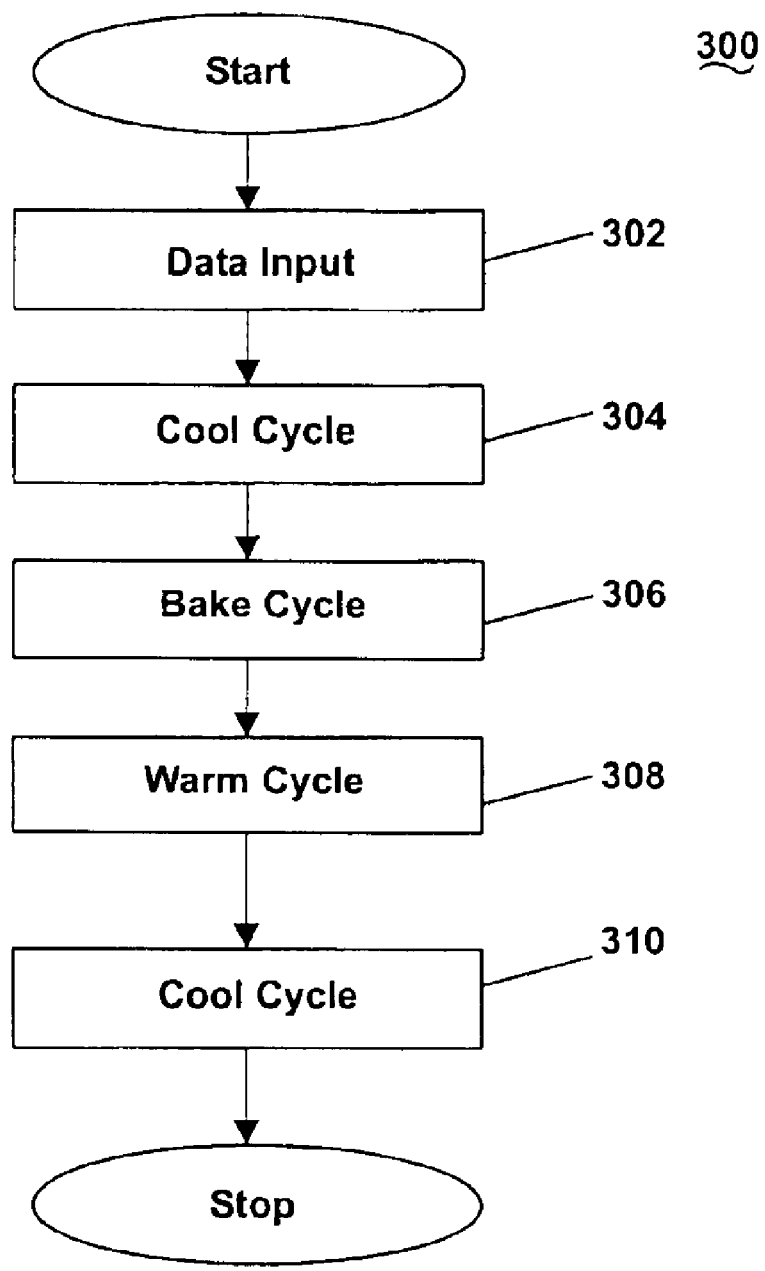
FIG. 12 is a schematic of a preferred main cycle of operation for the refrigerated oven comprising the cycles or steps of Data_Input, Cool_Cycle, Bake_Cycle, and then Warm_Cycle, followed by an optional Cool_Cycle.

Referring to FIG. 12, the preferred operating cycle 300 is in the form of a Time_Bake cycle where the food is placed in the cooking chamber 14 well before it is desired to begin the cooking of the food. In other words, the preferred operating cycle 300 includes a delay from the time the food is placed in the cooking chamber 14 until the desired time for the cooking cycle to begin. The delay can be caused by many different reasons. A typical example of such a situation is when the user desires to have food prepared and ready for dinner upon arrival at home after work but must place the food in the cooking chamber 14 in the morning before leaving for work. This example will be used to describe the operation of the preferred cycle 300.

Figure 13:
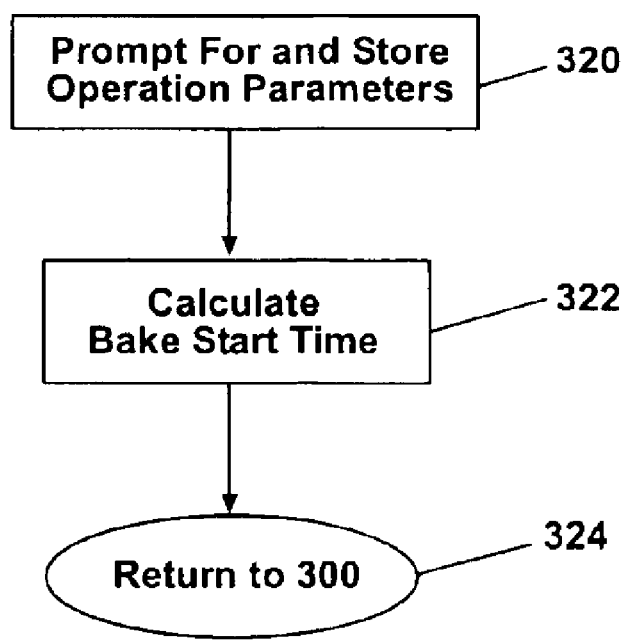
FIG. 13 is a schematic of a Data_Input step for setting the parameters of the preferred Time_Bake_Cycle.

Referring to FIG. 13, the Data_Input step 302 begins at step 320 by requesting the user to enter the user-defined operating parameters for the preferred cycle 300. The particular user-defined parameters will vary depending on the manner in which the preferred operating cycle 300 is implemented. However, under most implementations, a user will enter the time at which the cooking of the food is to be completed (the "End Time"), the length of time needed to cook the food (the "Cook Time"), and a temperature at which the food should the cooked (the "Bake Temp"). The user-defined data is then stored in the memory of the microprocessor.

The controller 220 at step 322 uses the user-defined End Time and the Cook Time to calculate the time at which the Bake_Cycle 306 should be started (the "Bake Start Time") to complete the cooking of the food by the End Time. The calculation of the Bake Start Time is easily accomplished with the microprocessor of the controller 220, which then stores the calculated Bake Start Time to initiate the cooking of the food for the Bake__Cycle 306. Program control is then returned at step 324 to the preferred cycle 300, which automatically advances to start the Cool__Cycle 304.

It is worth noting that there are many ways to implement the operating parameters of the preferred cycle 306 and the invention does not rely on or need any particular method. For example, instead of requiring the user to enter the End Time and Bake Time, the user could have been asked to enter the Bake Start Time and End Time, effectively making the user, instead of the controller 220, to perform the math to determine the Bake Start Time based on a given Cook Time. Also, the Cool__Cycle 304 does not have to automatically start at the completion of the Data__Input step 302, which is based on the logic that the user will put the food in the cooking chamber 14 just before or shortly after initiating the preferred cycle. The preferred cycle 306 can require that the user input a start time for the Cool__Cycle 304 based on the logic that the user might initiate the preferred cycle well before the food is placed in the cooking chamber 14.

In some cases, it may not even be necessary to have the user input the Bake Time. The Data__Input step 302 could prompt for information related to the food (type of food: cake, meat, etc.; physical characteristics: weight, frozen, thawed, etc.; cooking preference: well done, medium, rare) and determine the Cook Time therefrom. Many of the physical properties can be determined by sensors as it is well know in the art to do so.

It is also not even necessary to use times of the day in setting the operation parameters. Absolute times can be used in combination with a reference time, say, for example, the End Time is 8 hours from the initiation of the preferred cycle 300.

Since there are many ways to implement the parameters for the preferred cycle 300, the exact method is not germane to the invention. What is relevant to the invention is that the parameters provided enable the preferred cycle to know when to start and stop each of the cycles used: Cool__cycle 304, Bake__Cycle 306, Warm__Cycle 308, and, if used, the optional Cool__Cycle 310.

Figure 14:
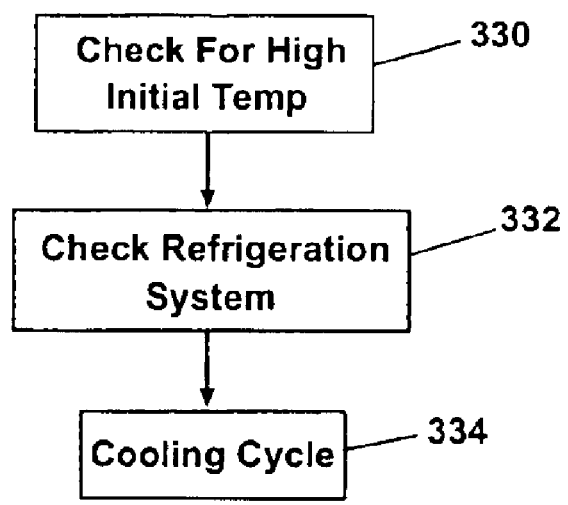
FIG. 14 is a schematic of the steps or cycles for the Cool_Cycle, which includes a Cooking Chamber Temp. Check, a Refrigeration System Check, and a Cooling_Cycle.

Returning now to the Cool__Cycle 304, FIG. 14 illustrates the sub-steps and cycles for the Cool__Cycle 304. The Cool__Cycle 304 begins at step 330 by checking the initial temperature of the cooking chamber 14 to determine if the cooking chamber 14 temperature (CCT) is less than a initiation temperature threshold (ITT), which is a temperature sufficiently low enough to begin operation of the modular refrigeration unit 20 without damaging the various components of the modular refrigeration unit 20 or substantially negatively impacting its operating performance. Upon confirming that the CCT is below the ITT, the modular refrigeration unit 20 is checked at step 332 to make sure that it is functioning properly, preferably by monitoring the CCT to determine if it drops below a threshold cooling temperature (TCT) for at least a predetermined time period, with both the TCT and the time period preferably set by the controller. After it is determined that the modular refrigeration unit 20 is working properly, the Cool__Cycle 304 advances to a Cooling__Cycle 334 that maintains the CCT at a temperature (Warm Temp.) sufficient to keep the food placed in the cooking chamber 14 from spoiling.

Figure 15:
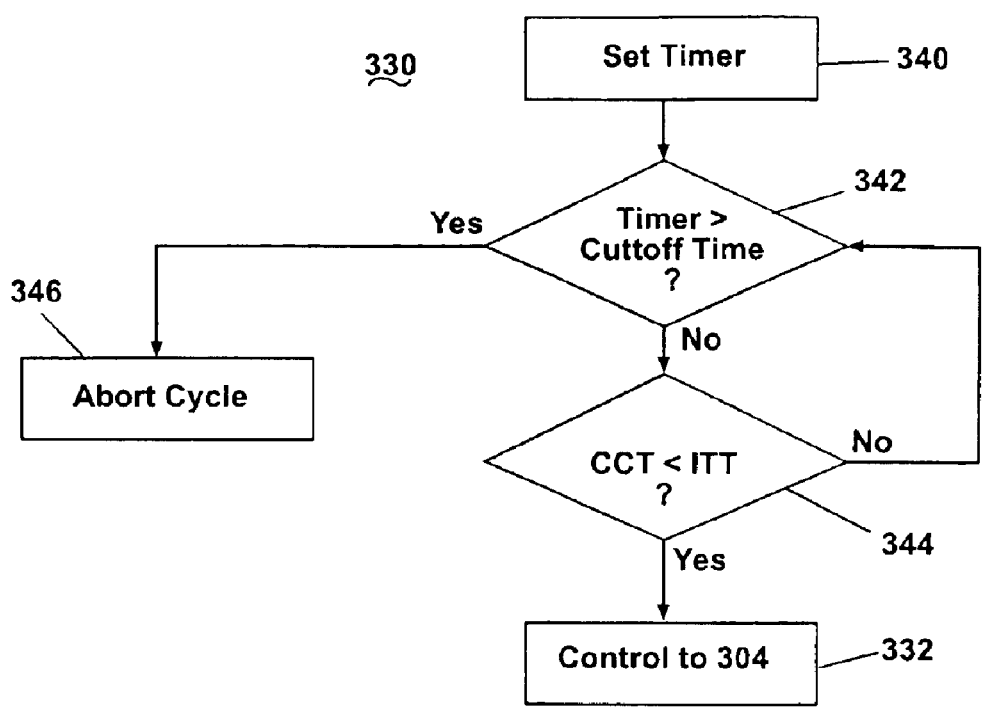
FIG. 15 is a schematic of Cooking Chamber Temp. Check for determining whether the temperature of the cooking chamber is within the operational range prior to the initiation of the modular refrigeration unit.

Looking at the sub-steps and cycles for the Cool__Cycle 304 greater detail, FIG. 15 illustrates the details of the initial temperature check step 330, which first begins by setting a timer 340. The timer 340 is then compared against a predetermined initial temperature Cutoff Time 342, which is preferably set by the controller. If the Cutoff Time 342 is not exceeded, the CCT is compared against the ITT 344. If the CCT is less than the ITT, the modular refrigeration unit 20 can be safely started without damage or undue performance degradation and the Cool__Cycle 304 then advances to the check of the refrigeration system step 332. However, if the CTT exceeds the ITT, then the initial temperature check 330 continues to monitor the CCT until either the CCT drops below the ITT or the Cutoff Time 342 is exceeded. If the Cutoff Time 342 is exceeded, it is assumed that the heating element of the refrigerated is still turned on or some other factor is adversely affecting the temperature of the cooking chamber 14, and the cycle is aborted at step 346.

Figure 16:
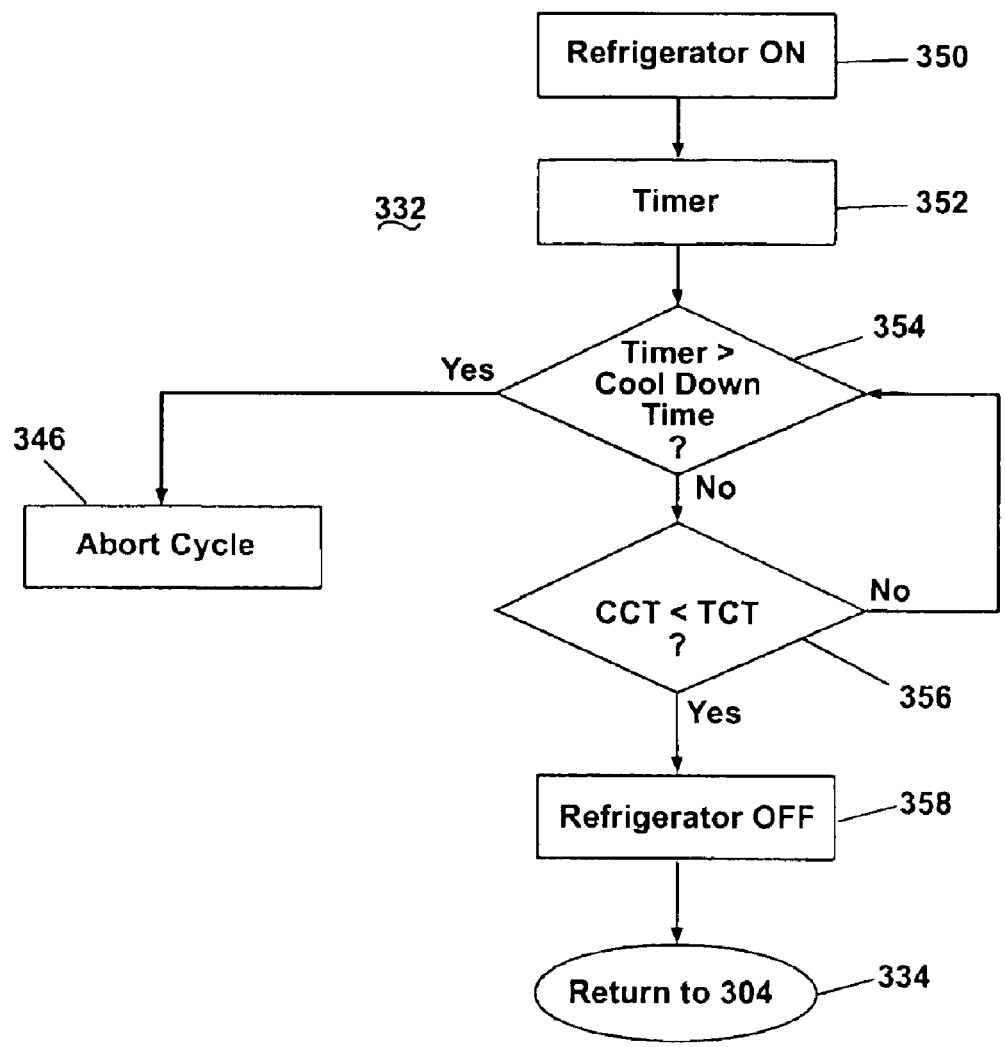
FIG. 16 is a schematic of Refrigeration System Check for determining if the refrigeration unit is functioning properly during the initiation of the Cooling_Cycle.

If the CCT is below the ITT 344 within the Cutoff Time 342, then control is passed to the check refrigeration system 332, which is shown in detail in FIG. 16. Upon entry into the check of the refrigeration system step 332, the modular refrigeration unit 20 is turned on at step 350 and a Timer 352 for the check refrigeration system step 332 is started. The Timer 352 is then compared against a predetermined Cool Down Time 354, which is preferably a parameter set by the controller 220. If the Cool Down Time 354 is not exceeded, the temperature of the cooking chamber 14 is compared against the threshold cooling temperature (TCT) 356, which is preferably a parameter set by the controller 220 and indicative of a temperature that is sufficiently low enough to prevent the food in the cooking chamber 14 from spoiling. If the CCT is less than the TCT 356, then it is assumed that the modular refrigeration unit 20 is functioning properly and the refrigerator is turned off at 358 and control is then returned to the Cooling__Cycle 334.

However, if the CCT is not less than the TCT 356, the check refrigeration system step 332 continues to monitor the CCT until either the CCT is less than the TCT 356 or the Cool Down Time 354 is exceeded. If the Cool Down Time 354 is exceeded, it is assumed that the modular refrigeration unit 20 is not functioning properly and the cycle is aborted at step 346.

Figure 17:
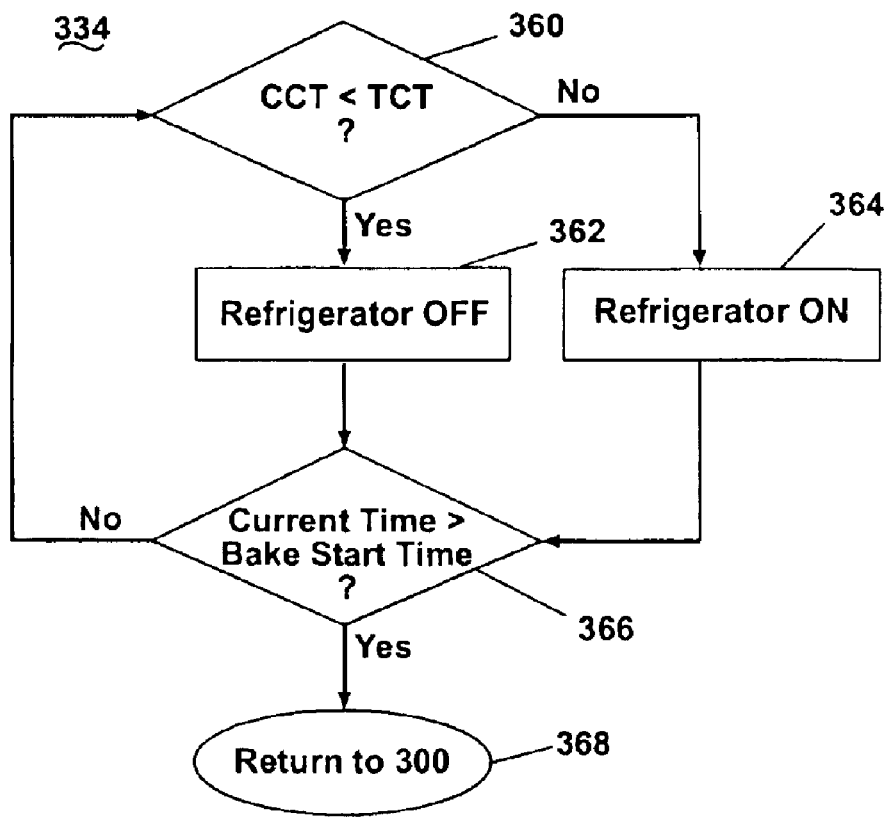
FIG. 17 is a schematic of the Cooling_Cycle for maintaining the temperature of the cooking chamber at a predetermined cooling temperature.

Upon the successful completion of the check refrigeration step 332, control then passes to the Cooling__Cycle 334 shown in FIG. 17. The Cooling__Cycle 334 monitors the CCT at step 360 and turns the modular refrigeration unit 20 off at 362 if the CCT is less than the TCT or turns the modular refrigeration unit 20 on at step 364 if the CCT is greater than the TCT. The cycling on/off of the modular refrigeration unit 20 is continued as long as the Current Time (time of day) does not exceed the Bake Start Time, which is tested at step 366. If the Current Time does exceed the Bake Start Time, then the Cool__Cycle 304 is completed and control passes back to the Bake__Cycle 306.

It is worthy of a brief comment to note that the check refrigeration system step 332 and the Cooling__Cycle 334 could easily be combined. Since the Cooling__Cycle 334 and the check refrigeration system step 332 compare the CCT against the TCT, the check of the refrigeration system at step 332 could be easily accomplished by performing the time monitoring function of the check refrigeration step 332 during the Cooling__Cycle 334. It is also within the scope of the invention that the value of the TCT may not be the same for the refrigeration system check 332 and the Cooling__Cycle 334.

Although not illustrated in FIG. 17, under certain circumstances it will be desirable for the Cooling__Cycle 334 to be terminated before the Bake Start Time to permit the CCT to rise naturally based on the ambient room temperature. The termination of the Cooling_Cycle 334 prior to the Bake Start Time will reduce the amount of time needed to preheat the cooking chamber to the Bake Temp as part of the Bake_Cycle 306. If such an early termination of the Cooling_Cycle 334 is used, it is contemplated that the corresponding time period will be a controller 220 selected parameter but could be user defined.

Figure 18:
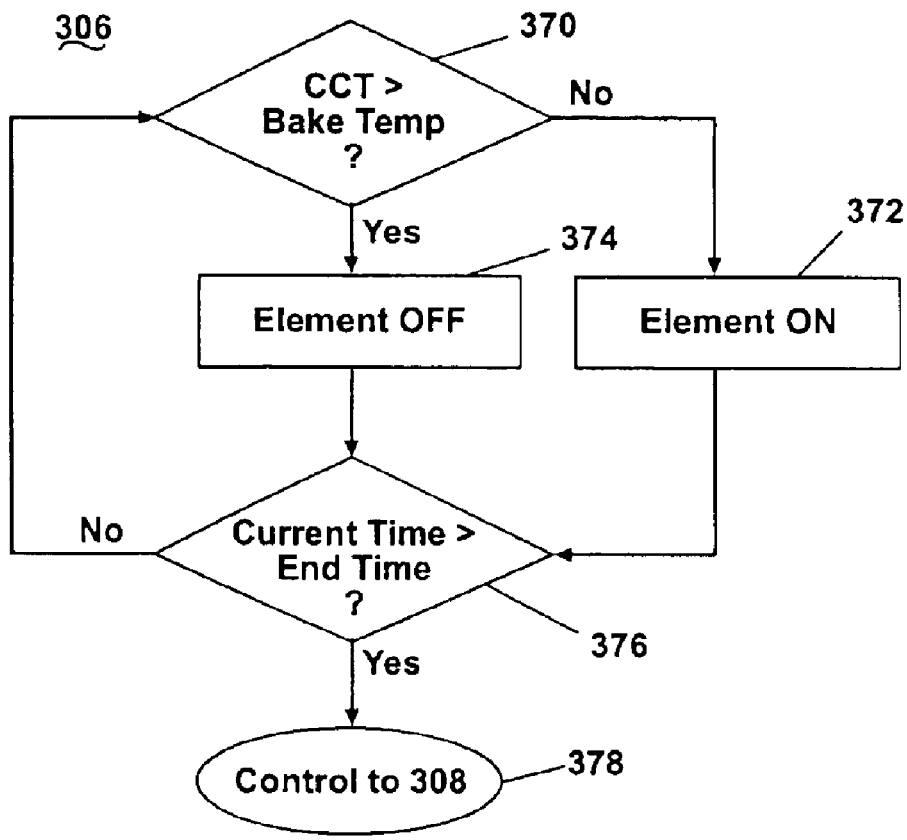
FIG. 18 is a schematic of the Bake_Cycle for baking food placed in the cooking chamber.

Upon the successful completion of the Cooling_Cycle 304, the Bake Cycle 306 illustrated in FIG. 18 is initiated. It should be noted that the Bake_Cycle 306 is a generic Bake_Cycle and that any suitable Bake_Cycle can be used. The Bake_Cycle 306 begins by comparing the CCT against the Bake Temp at step 370 and turning on the heating element at 372 if the CCT is less than the Bake Temp or turning off the heating element at 374 if the CCT is greater than the Bake Temp. The cycling on/off of the heating element is continued as long as the Current Time does not exceed the End Time, which is tested at step 376. If the Current Time does exceed the End Time, then the Bake_Cycle 304 is completed and control passes back to the Warm_Cycle 308 at 308.

Figure 19:
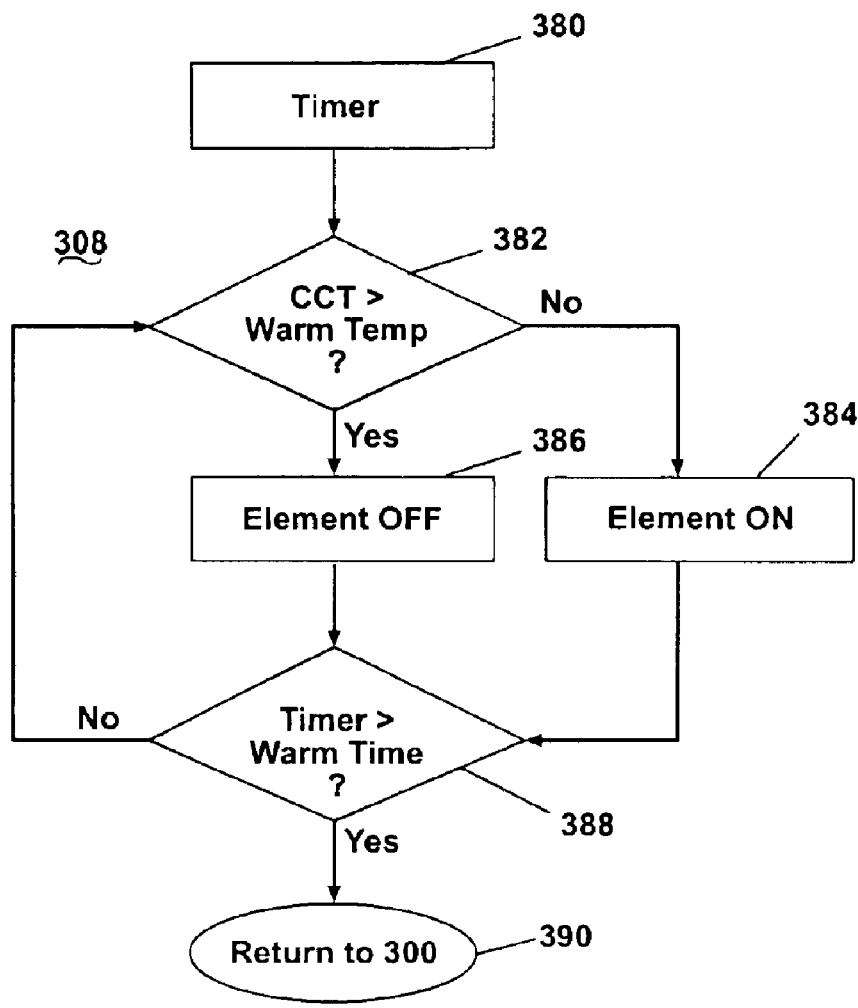
FIG. 19 is a schematic of a Warm_Cycle for maintaining cooked food at a temperature suitable for serving for a predetermined time after the completion of the Bake_Cycle.

Referring to FIG. 19, the Warm_Cycle 308 maintains the CCT at a temperature (the Warm Temp) so that the cooked food is maintained at a temperature suitable for serving for a predetermined time (the Warm Time). The Warm_Cycle 306 begins by starting a timer 380. The CCT is then compared against a Warm Temp at step 382 and the heating element is turned on at 384 if the CCT is less than the Warm Temp or turned off if the CCT is greater than the Warm Temp. The cycling on/off of the heating element is continued as long as the timer 380 does not exceed the Warm Time, which is tested at step 386. If the Warm Time does exceed the time 380, then the Warm_Cycle 304 is completed and control passes back to the optional Cool_Cycle 310.

The Warm Temp and the Warm Time are preferably controller-selected parameters that are stored in the read-only memory of the controller 220. It is within the scope of the invention for the user to set the Warm Temp and the Warm Time. The user can enter the Warm Temp and the Warm Time during the Data_Input step 302 of the preferred cycle 300. If desirable, the Data_Input step 302 can even include an option for the user to set the Warm Temp and/or Warm Time or the controller 220 can set them. It is preferred that the Warm Temp and Warm Time parameters be limited in such a manner to prevent the cooked food from becoming dried out to the extent that it is not edible.

The Warm Time and Warm Temp are preferably selected to be suitable for most baked foods to simplify the process. However, it is within the scope of the invention for the Warm Time and Warm Temp to be variable and even food or environment dependent. For example, it is known to use moisture sensors in ovens that are controlled by the controller. If the rate or absolute amount of moisture is at a level indicative of the food drying out beyond an edible limit, the Warm Time can automatically terminate, resulting in a dynamic time. Also, the user can be prompted to enter the type of food during the Data_Input cycle, say for example, Cake, Casserole, Soufflé, etc., and a predetermined Warm Time and even a predetermined Warm Temp can be stored in the controller memory for each food type. The food type can even be used in combination with the moisture sensor if desired.

The function of the Warm_Cycle 308 is to maintain the cooked food at a temperature suitable for serving for a predetermined period of time. In that way, a user who does not make it home at the end of the Bake_Cycle 306 will still have cooked food that is immediately ready for serving upon their arrival. The Warm_Cycle 308 is a great convenience for the user and if for any reason the user is late, the food will still be maintained at a temperature suitable for serving for a predetermined period of time.

Since the Warm_Cycle 308 is thought to be a great convenience for the user, it is preferred that the Warm_Cycle 308 automatically start at the end of the Bake_Cycle 306. However, it is within the scope of the invention for the Warm_Cycle to the selected by the user as part of the Data_Input step 302.

One option for the Warm_Cycle 308 is that it can be terminated prior to the running of the Warm Time upon the opening of the oven door 58, which would activate the oven door sensor coupled to the controller 220. Under most circumstances, it is anticipated that the user will arrive home prior to the termination of the Bake_Cycle 306. Thus, where the Warm_Cycle 308 is automatically initiated after the completion of the Bake_Cycle 306, the opening of the oven door 58 by the user will indicate that the user is now present and the food is ready to be served, resulting in the termination of the Warm_Cycle 308. The option of terminating the Warm_Cycle 308 in response to the opening of the oven door 58 can easily be implemented by checking the status of the oven door flag in the memory of the controller 220 before, during, or after the check of the warm time at step 388.

In the circumstance where the user selects the Warm_Cycle 308 during the Data_Input step 302, it is preferred that the opening of the of the door 58 not result in the termination of the Warm_Cycle 308 since it is presumed that the user selection of the Warm_Cycle 308 is indicative of the user's desire for the Warm_Cycle 308 to run its entire course. If the user selects the Warm_Cycle 308 and desires for it to be terminated prior to the expiration of the Warm Time, then the user can manually stop the cycle.

The optional Cool_Cycle 310 is substantially identical to the Cool_Cycle 304 and will not be described in detail. It is preferred that the optional Cool_Cycle 310 automatically initiate at the end of the Warm_Cycle 308. However, unlike the Cool_Cycle 304, it is preferred that the Cool_Cycle 310 will preferably run until manually terminated by the user since it is anticipated that the circumstances under which the Cool_Cycle 310 is initiated are when the user cannot arrive home a substantial amount of time after the end of the Bake_Cycle.

It is contemplated, however, that the optional Cool_Cycle 310 should not be permitted to run beyond a certain predetermined time, preferably 24 hours. Under such circumstances, the controller 220 can be programmed with a predetermined time for terminating the optional Cool_Cycle 310.

Another option for terminating the optional Cool_Cycle 310 is the opening of the oven door 58 in a manner similar to the previously described termination of the Warm_Cycle 308. If the oven door 58 is opened during a Cool_Cycle 310 that was automatically initiated by the controller 220, then it is contemplated that the user has arrived home and is removing the food from the cooking chamber 14, making it now appropriate to terminate the Cool_Cycle 310.

As with the Warm_Cycle 308, when the Cool_Cycle 310 is selected by the user during the Data_Input step 302, it is assumed that the user desires to have the Cool_Cycle 310 terminate naturally and the opening of the oven door 58 will not serve to terminate the Cool_Cycle 310.

The preferred Time_Bake_Cycle with warming and optional cooling according to the invention provides the user with a very convenient means for cooking food while away from home, the cooked food being ready to eat at the desired time, and with the cooked food being maintained at a temperature ready to eat if the user is late in arriving. The maintenance of the cooked food at a temperature suitable for serving upon removal from the cooking chamber 14 provides the user with a great deal of flexibility in their schedule. The optional Cool_Cycle 310 further enhances the flexibility of the user in that if for some unknown reason the user must arrive home at a time much later than ever contemplated the food will not be warmed until inedible.

From the above, it is apparent that many modifications and variations of the present invention are possible in light of the above teachings. It is, therefore, to be understood that, within the scope of the appended claims, the invention may be practiced otherwise than as specifically described.

What is claimed is:

1. A method of operating a refrigerated oven to cook a food item therein, the refrigerated oven comprising a cooking chamber having a heating element for heating the cooking chamber, a refrigeration unit for cooling the cooking chamber, an insulated housing forming a refrigerated air path between the refrigeration unit and the cooking chamber, a temperature sensor for sensing the temperature of the cooking chamber, a data input device for inputting user-selected cooking cycle parameters, and a controller operably coupling the heating element, refrigeration unit, temperature sensor, and the data input device to selectively actuate the heating element and the refrigeration unit in response to the sensed temperature to implement the method as defined by the cooking cycle parameters, the method comprising the steps of:

A. determining the temperature of the cooking chamber;
   B. producing cooled air in the refrigeration unit for a first period of time if the temperature of the cooking chamber is below a predetermined threshold temperature, and delaying production of cooled air in the refrigeration unit until the temperature is below the predetermined threshold temperature if the temperature of the cooking chamber is not below the predetermined threshold temperature;
   C. circulating the cooled air through the refrigerated air path to the cooking chamber to prevent spoilage of the food item; and
   D. heating the cooking chamber to cook the food item in the cooking chamber by cycling the heating element for a second time period.

2. The method of claim 1 wherein the predetermined threshold temperature is about 170° F.

3. The method of claim 1 and further comprising terminating the operation of the refrigerated oven if production of cooled air in the refrigeration unit is delayed beyond a predetermined time.

4. The method of claim 1 wherein step C includes maintaining the temperature of the cooking chamber at a first predetermined temperature.

5. The method of claim 1 wherein step D includes maintaining the temperature of the cooking chamber at a second predetermined temperature.

6. The method of claim 5 wherein the second predetermined temperature is inputted into the controller by a user.

7. The method of claim 1 and further comprising determining the first time period based on at least one cooking cycle parameter inputted by a user.

8. The method of claim 1 wherein the cooking cycle parameters comprise an End Time or the time of day that step D is to be completed, and a second cooking cycle parameter comprising a Bake Time or the length of time for cooking the food item, termination of the first time period being determined by subtracting the Bake Time from the End Time.

9. The method of claim 8 wherein the second time period is equal to the Bake Time.

10. The method of claim 1 and further comprising step:
    E. after the completion of step D, heating the cooking chamber to maintain the food item at a temperature suitable for serving upon removal from the cooking chamber by cycling the heating element for a third time period.

11. The method of claim 10 wherein step E is automatically initiated after step C.

12. The method of claim 11 wherein step E is terminated upon the opening of the oven door.

13. The method of claim 10 wherein step E includes maintaining the temperature of the cooking chamber at a third predetermined temperature.

14. The method of claim 10 and further comprising the step of:
    F. cooling the cooking chamber after step E to prevent the spoiling of the cooked food by cycling the refrigeration unit for a fourth time period.

15. The method of claim 14 wherein step F is automatically initiated after step E.

16. The method of claim 15 wherein step F is terminated upon the opening of the oven door.

17. The method of claim 1 wherein step B is terminated if the cooking chamber is not reduced to a second predetermined threshold temperature within a predetermined time period.

18. The method of claim 17 wherein the second predetermined threshold temperature is 170° F.

19. A method of operating a refrigerated oven to cook a food item therein, the refrigerated oven comprising a cooking chamber having a heating element for heating the cooking chamber, a refrigeration unit for cooling the cooking chamber, a temperature sensor for sensing the temperature of the cooking chamber, a data input device for inputting user-selected cooking cycle parameters, and a controller operably coupling the heating element, refrigeration unit, temperature sensor, and the data input device to selectively actuate the heating element and the refrigeration unit in response to the sensed temperature to implement the method as defined by the cooking cycle parameters, the method comprising the steps of:

A. determining a first cycle parameter comprising a Bake Time or a length of time to cook a food item; and, determining an End Time or the time of day that heating of the cooking chamber to cook the food item is to be complete;
   B. cooling the cooking chamber to prevent spoilage of the food item in the cooking chamber by cycling the refrigeration unit for a first time period determined by subtracting the Bake Time from the End Time;
   C. heating the cooking chamber to cook the food item in the cooking chamber by cycling the heating element for a period of time corresponding to the Bake Time; and
   D. determining the temperature of the cooking chamber; and,
   E. delaying the initiation of step B until the temperature of the cooking chamber as determined in step D is below a predetermined threshold temperature.

* * * * *